United States Patent
Kikuchi et al.

(10) Patent No.: US 8,432,135 B2
(45) Date of Patent: Apr. 30, 2013

(54) METHOD OF CONTROLLING LEAD-ACID BATTERY AND POWER SUPPLY SYSTEM

(75) Inventors: Tomoya Kikuchi, Aichi (JP); Harumi Murochi, Aichi (JP); Yasuyuki Yoshihara, Aichi (JP)

(73) Assignee: Panasonic Corporation, Osaka (JP)

(*) Notice: Subject to any disclaimer, the term of this patent is extended or adjusted under 35 U.S.C. 154(b) by 425 days.

(21) Appl. No.: 12/991,343

(22) PCT Filed: Aug. 7, 2009

(86) PCT No.: PCT/JP2009/003808
§ 371 (c)(1),
(2), (4) Date: Nov. 5, 2010

(87) PCT Pub. No.: WO2010/016275
PCT Pub. Date: Feb. 11, 2010

(65) Prior Publication Data
US 2011/0057619 A1    Mar. 10, 2011

(30) Foreign Application Priority Data
Aug. 7, 2008    (JP) .................................. 2008-203985

(51) Int. Cl.
*H02J 7/00*    (2006.01)
(52) U.S. Cl.
USPC ............ 320/132; 320/149; 320/134; 324/428
(58) Field of Classification Search .................. 320/132, 320/134, 136, 149; 324/427, 428
See application file for complete search history.

(56) References Cited

U.S. PATENT DOCUMENTS

| | | | |
|---|---|---|---|
| 5,363,031 A * | 11/1994 | Miller et al. ................... | 320/115 |
| 5,672,951 A * | 9/1997 | Shiota ............................ | 320/132 |
| 6,275,006 B1 | 8/2001 | Koike et al. | |
| 2008/0094034 A1 | 4/2008 | Takahashi et al. | |

FOREIGN PATENT DOCUMENTS

| | | |
|---|---|---|
| CN | 1819399 A | 8/2006 |
| CN | 101170202 A | 4/2008 |
| JP | 11-089104 | 3/1999 |
| JP | 2003-219571 | 7/2003 |
| JP | 2006-114312 | 4/2006 |
| RU | 2 265 921 C2 | 12/2005 |

OTHER PUBLICATIONS

Chinese Office Action issued in Chinese Patent Application No. 200980114850.1 dated Sep. 5, 2012. Decision on Grant a Patent with English translation dated Apr. 2, 2012 issued in RU Patent Application No. 2010145167.

* cited by examiner

*Primary Examiner* — Edward Tso
*Assistant Examiner* — Aaron Piggush
(74) *Attorney, Agent, or Firm* — McDermott Will & Emery LLP

(57) ABSTRACT

An object of this invention is to simultaneously resolve a decline in capacity due to undercharging of, and degradation due to overcharging of, a lead-acid battery, which occur as a result of random charging. A method of controlling a lead-acid battery of this invention is characterized in that a first region extending until an accumulated discharged capacity $D_1$ at which a theoretical discharged capacity is the maximum value $D_{max}$ is reached, and a subsequent second region in which the accumulated discharged capacity $D_1$ is exceeded, are set, and in that a value $R_1$ obtained by dividing an accumulated charged capacity $C_1$ by the accumulated discharged capacity $D_1$ in the first region is made to be larger than a value $R_2$ obtained by dividing an accumulated charged capacity $C_2$ by an accumulated discharged capacity $D_2$ in the second region.

20 Claims, 11 Drawing Sheets

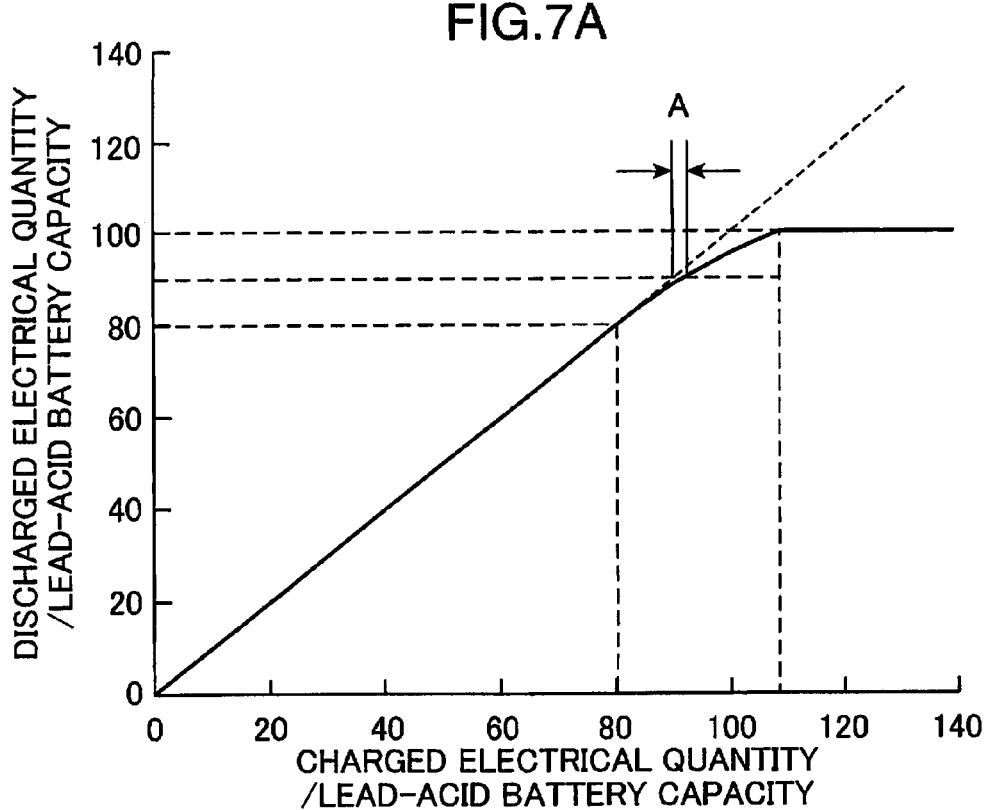
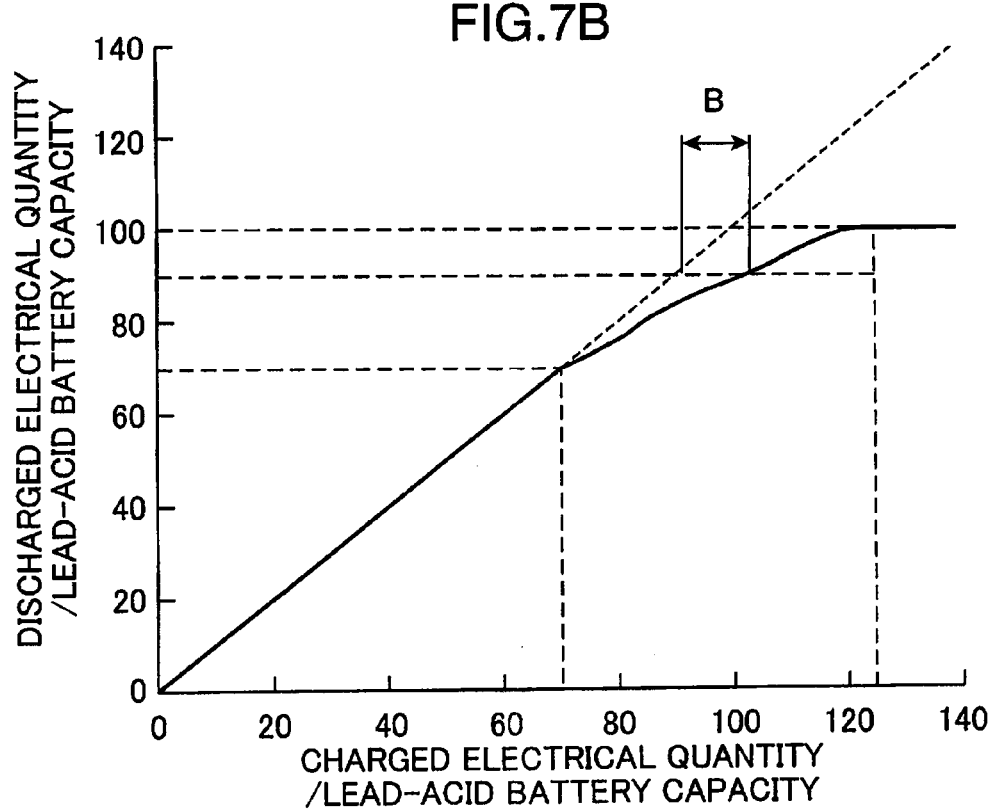

METHOD OF CONTROLLING LEAD-ACID BATTERY AND POWER SUPPLY SYSTEM

RELATED APPLICATIONS

This application is the U.S. National Phase under 35 U.S.C. §371 of International Application No. PCT/JP2009/003808, filed on Aug. 7, 2009, which in turn claims the benefit of Japanese Application No. 2008-203985, filed on Aug. 7, 2008, the disclosures of which Applications are incorporated by reference herein.

TECHNICAL FIELD

This invention relates to a method of controlling a lead-acid battery, and to a power supply system using a lead-acid battery.

BACKGROUND ART

In the midst of increasing momentum to suppress carbon dioxide emissions and depletion of petroleum resources, expectations have been placed on the development of compact vehicles employing only electric power (for example, lead-acid batteries or other secondary batteries) as motive power.

Of these, lead-acid batteries stand up to harsh usage conditions and have moderate mass, and so are useful as the motive power source of, for example, hauling vehicles.

Various methods for efficient charging of lead-acid batteries are being studied. In Patent Document 1, a method is considered of repeatedly charging the next time with a charging quantity (synonymous with charged electrical quantity) slightly greater than the discharge quantity (synonymous with discharged electrical quantity) discharged after the previous charging. It is stated that by means of this method, except for prescribed refresh overcharging (putting the lead-acid battery into an overcharged state, and causing recovery of the capacity of the lead-acid battery), while avoiding overcharging, declines in the capacity of the lead-acid battery due to undercharging can be prevented.

In a lead-acid battery, until the number of charge/discharge cycles, consisting of a charge cycle and an immediately following discharge cycle, reaches a prescribed number of cycles (or, until the accumulated value of the discharge electrical quantity reaches a prescribed value), by charging the next time with a charging quantity slightly greater than the discharge quantity discharged after the previous charging, a decline in capacity due to undercharging can be prevented. However, it has been found that if the number of charge/discharge cycles exceeds a prescribed number of cycles (or, if the accumulated value of the discharge electrical quantity exceeds a prescribed value), by charging the lead-acid battery with a charging quantity slightly greater than the discharge quantity discharged after the previous charging, the lead-acid battery enters an overcharged state, and degradation occurs.
Patent Document 1: Japanese Patent Application Laid-open No. 2003-219571

DISCLOSURE OF THE INVENTION

This invention was devised in order to resolve the above-described problem, and has as an object the simultaneous resolution of two types of problems with lead-acid batteries occurring due to random charging (a decline in capacity due to undercharging, and degradation due to overcharging).

A method of controlling a lead-acid battery according to one aspect of the invention comprises a first computation step of computing a first accumulated charged electrical quantity by accumulating a charged electrical quantity for each charge cycle from the start of cycled use of a lead-acid battery, and of computing a first accumulated discharged electrical quantity by accumulating a discharge electrical quantity for each discharge cycle from the start of cycled use of the lead-acid battery; a judgment step of judging that the lead-acid battery is in a first region which is a partial region in a life cycle from the start of cycled use of the lead-acid battery until the life of the lead-acid battery ends, when the first accumulated discharged electrical quantity is less than a first setting value $D_1$ which is the first accumulated discharged electrical quantity obtained when, in a process of change of a capacity of the lead-acid battery occurring due to charge/discharge cycles of the lead-acid battery, the capacity is the maximum value $D_{max}$, and of judging that the lead-acid battery is in a second region which is a region after the first region and extends until the life of the lead-acid battery ends, when the first accumulated discharged electrical quantity exceeds the first setting value $D_1$; a second computation step of, after judging in the judgment step that the lead-acid battery is in the second region, computing a second accumulated charged electrical quantity by accumulating a charged electrical quantity for each charge cycle in the second region, and of computing a second accumulated discharged electrical quantity by accumulating a discharged electrical quantity for each discharge cycle in the second region; and a control step of controlling the charged electrical quantity in the first region such that a first entire charged electrical quantity $C_1$, which is the first accumulated charged electrical quantity at the end of the first region, is the electrical quantity equal to the product of the first setting value $D_1$ and a first value $R_1$ set in advance, and of controlling, after the lead-acid battery is judged to be in the second region, the charged electrical quantity in the second region such that a second entire charged electrical quantity $C_2$, which is the second accumulated charged electrical quantity when the life of the lead-acid battery comes to an end, is the electrical quantity equal to the product of the second setting value $D_2$, which is the second accumulated discharged electrical quantity when the life of the lead-acid battery comes to an end, and a second value $R_2$ set in advance to a value smaller than the first value $R_1$.

According to this invention, the accumulated value of the charged electrical quantity in the entire first region is an accumulated value equal to or greater than the accumulated value of the discharged electrical quantity in the entire first region, so that in the first region the decrease due to undercharging in the electrical quantity which can be charged/discharged can be reduced. Further, the proportion of the accumulated value of the charged electrical quantity in the entire second region to the accumulated value of the discharged electrical quantity in the entire second region can be made smaller that the proportion of the accumulated value of the charged electrical quantity in the entire first region to the accumulated value of the discharged electrical quantity in the entire first region. It is therefore possible to reduce a prominent decline in the electrical quantity which can be charged/discharged in the second region caused charging with an excessively charged electrical quantity.

Hence according to this invention, when the first accumulated discharged electrical quantity, representing the accumulated value of the discharged electrical quantity from the start of cycled use of the lead-acid battery, is less than the first setting value $D_1$ which is the boundary between the first region and the second region, the decline due to undercharging in the electrical quantity which can be charged/discharged can be reduced, and when the first accumulated discharged electrical quantity exceeds the first setting value $D_1$, acceleration caused by overcharging in the decline in the electrical quantity which can be charged/discharged can be reduced.

Hence according to this invention, by evaluating the properties of the lead-acid battery and performing reasonable charging repeatedly, compared with control methods of random charging of a lead-acid battery, a longer life for the lead-acid battery can be realized.

BRIEF DESCRIPTION OF THE DRAWINGS

FIG. 7A shows the charging efficiency in a first region of a valve-regulated lead-acid battery, and FIG. 7B shows the charging efficiency in a second region of a valve-regulated lead-acid battery.

BEST MODE FOR CARRYING OUT THE INVENTION

Below, preferred embodiments for implementation of the invention are explained using the drawings.

A first embodiment is characterized as the control method described below.

Figure 1:
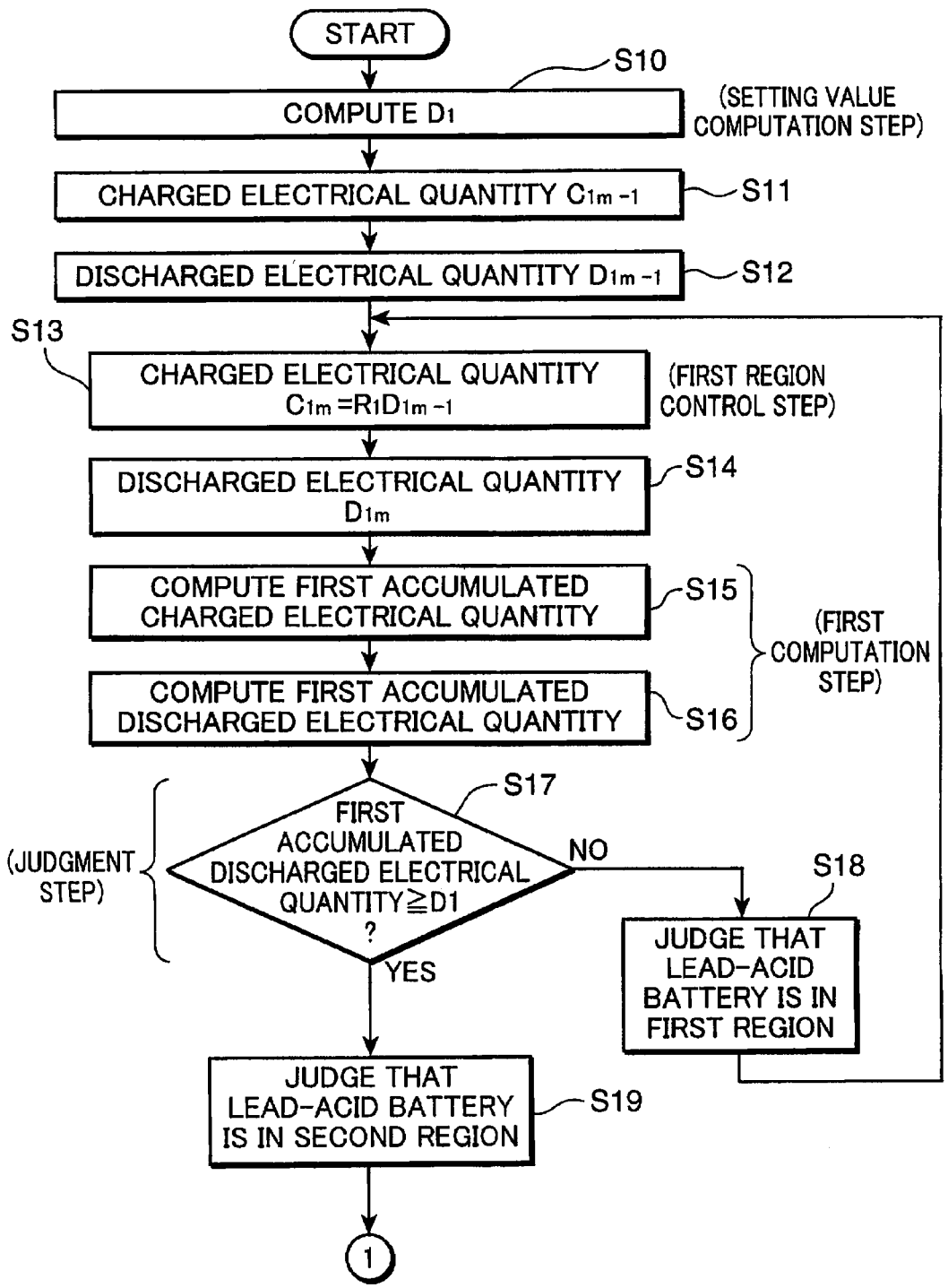
FIG. 1 is a flowchart showing an example of the method of controlling a lead-acid battery of one embodiment of the invention.
Figure 2:
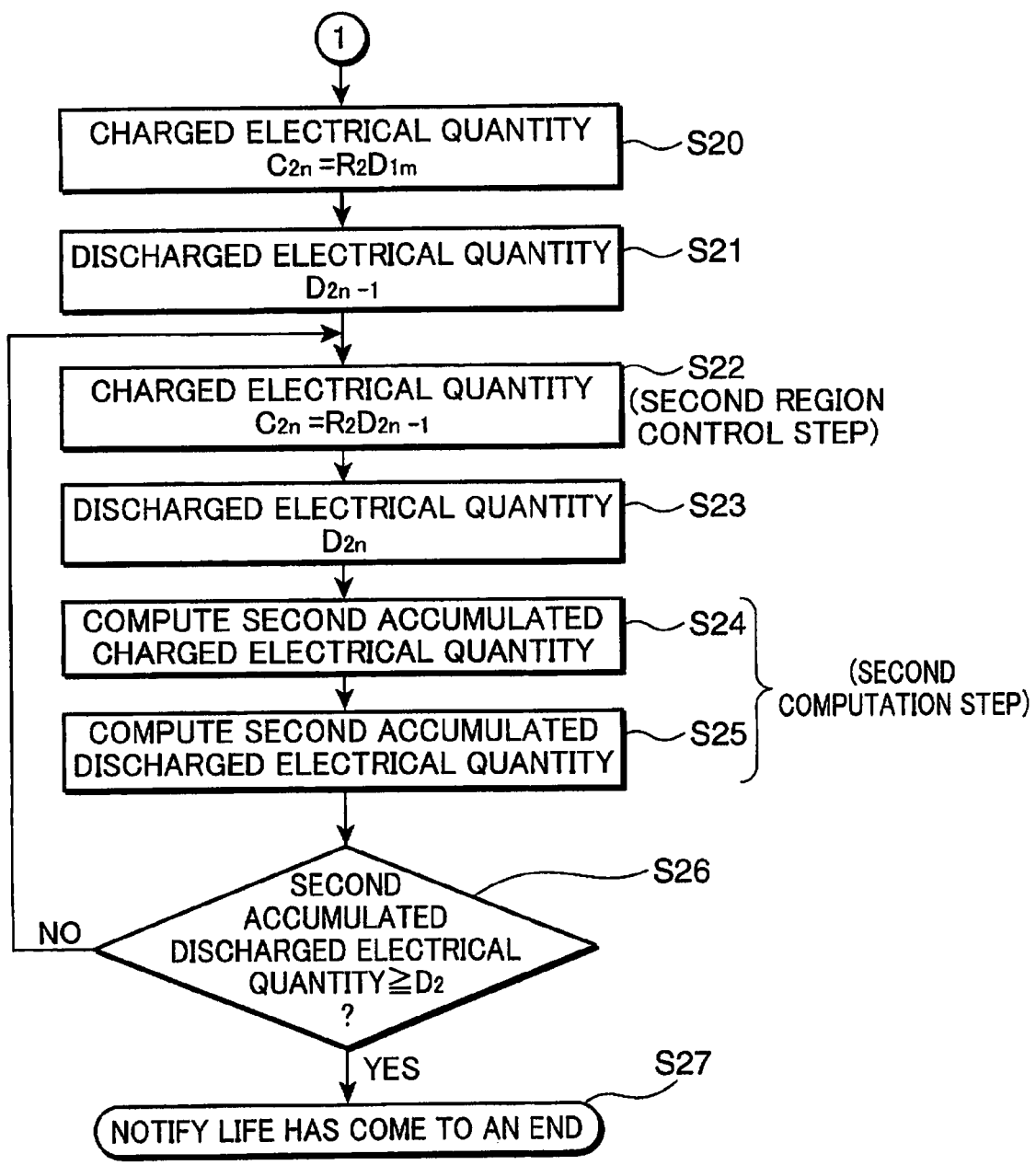
FIG. 2 is a flowchart showing an example of the method of controlling a lead-acid battery of one embodiment of the invention.

FIG. 1 and FIG. 2 are flowcharts showing an example of the method of controlling a lead-acid battery of a first embodiment. When the lead-acid battery which is a power supply is used starting from an unused state, a control portion 43 (see FIG. 11) computes a first setting value $D_1$, which is a first accumulated discharged electrical quantity when, in the process of changes in the capacity of the lead-acid battery occurring due to charge/discharge cycles of the lead-acid battery, the capacity has become a maximum value $D_{max}$ (step S10: setting value computation step). Here, the first accumulated discharged electrical quantity means the electrical quantity obtained by accumulating the discharged electrical quantity for each discharge cycle of the lead-acid battery in a first region. Further, the first setting value $D_1$ is for example determined by processing described below.

And, the lead-acid battery is charged with an arbitrary charged electrical quantity $C_{1m-1}$ in the charging of step S11, and is discharged with an arbitrary discharged electrical quantity $D_{1m-1}$ ($C_{1m-1} > D_{1m-1}$) in the discharging of step S12. Here, the subscript "1m−1" means the (m−1)th cycle in the first region. For example, the discharged electrical quantity $D_{1m-1}$ means, in the first region, the charged electrical quantity in the charge cycle immediately preceding charging in the mth cycle of controlling the charged electrical quantity. Further, the discharged electrical quantity $D_{1m-1}$ means, in the first region, the discharged electrical quantity in the discharge cycle immediately preceding discharging in an arbitrary mth cycle.

The control portion 43 (see FIG. 11) performs charging such that the charged electrical quantity in the charge cycle immediately after step S12 is a charged electrical quantity $C_{1m}$ equal to the product of the discharged electrical quantity $D_{1m-1}$ in step S12 (that is, the discharged electrical quantity in the immediately preceding discharge cycle) and a coefficient $R_1$ (step S13: first region control step). And, the lead-acid battery is discharged by an arbitrary discharged electrical quantity $D_{1m}$ (step S14).

And, a first computation portion 41 (see FIG. 11) computes the accumulated charged electrical quantity in the first region (hereafter called the first accumulated charged electrical quantity) (step S15: first computation step). Here, the first accumulated charged electrical quantity means the accumulated value of the charged electrical quantity in each charge cycle of the lead-acid battery in the first region. Further, the first computation portion 41 computes the first accumulated discharged electrical quantity (step S16: first computation step). For example, the first accumulated discharged electrical quantity after performing discharge in steps S12 and S14 is the electrical quantity obtained by adding the discharged electrical quantity $D_{1m}$ in step S14 to the discharged electrical quantity $D_{1m-1}$ in step S12.

A judgment portion 42 (see FIG. 11) judges whether the first accumulated discharged electrical quantity exceeds the first setting value $D_1$ (step S17: judgment step). If the first accumulated discharged electrical quantity is less than the first setting value $D_1$ (NO in step S17), the judgment portion 42 judges that the life cycle of the lead-acid battery is at the present time in the first region (step S18). Here, the first region is a partial region in the life cycle from the start of cycled use of the lead-acid battery until the life of the lead-acid battery ends. Further, a second region, described below, is a region following the first region, and is a region extending until the life of the lead-acid battery ends.

Thereafter, the processing described below is repeated. The control portion 43 performs charging such that the charged electrical quantity $C_{2n}$ in the charge cycle is equal to the charged electrical quantity which is the product of the discharged electrical quantity $D_{2n-1}$ in the immediately preceding discharge cycle and a coefficient $R_2$ (step S23: second region control step). When an arbitrary discharged electrical quantity $D_{1m}$ is discharged in the discharge cycle immediately following this charging (step S14), the first computation portion 41 accumulates the charged electrical quantity $C_{1m}$ with the first accumulated charged electrical quantity up to that time (step S15). Further, the first computation portion 41 accumulates the discharged electrical quantity $D_{1m}$ with the first accumulated discharged electrical quantity up to that time (step S16). And, the judgment portion 42 judges whether the first accumulated discharged electrical quantity obtained exceeds the first setting value $D_1$ (step S17).

Here, the subscript "2n–1" means the (n–1)th cycle in the second region. For example, the discharged electrical quantity $D_{2n-1}$ means, in the second region, the charged electrical quantity in the charge cycle immediately preceding charging in the nth cycle of controlling the charged electrical quantity. Further, the discharged electrical quantity $D_{2n-1}$ means, in the second region, the charged electrical quantity in the charge cycle immediately preceding charging in an arbitrary nth cycle.

By repeating the above processing, when the first accumulated discharged electrical quantity exceeds the first setting value $D_1$ (YES in step S17), the judgment portion 42 judges that the life cycle of the lead-acid battery is at the present time in the second region (step S19).

The control portion 43 performs control such that the charged electrical quantity $C_{21}$ in the subsequent charge cycle is the charged electrical quantity equal to the product of the charged electrical quantity $D_{1m}$ in the immediately preceding discharge cycle and the coefficient $R_2$ (step S20). And, the lead-acid battery is discharged by an arbitrary charged electrical quantity $D_{2n-1}$ (step S21).

The control portion 43 performs control such that the charged electrical quantity $C_{2n}$ in the subsequent charge cycle is the charged electrical quantity equal to the product of the charged electrical quantity $D_{2n-1}$ in the immediately preceding discharge cycle and the coefficient $R_2$ (step S22: second region control step). Here, the charged electrical quantity $D_{2n-1}$ means, in the second region, the charged electrical quantity in the discharge cycle immediately preceding discharge in the arbitrary nth cycle.

When, in the discharge cycle immediately following this charging, an arbitrary discharged electrical quantity $D_{2n}$ is discharged (step S23), a second computation portion 44 (see FIG. 11) computes a second accumulated charged electrical quantity in the second region (step S24: second computation step). Further, the second computation portion 44 computes a second accumulated discharged electrical quantity in the second region (step S25: second computation step). For example, the second accumulated discharged electrical quantity after performing discharge in steps S22 and S24 is the electrical quantity obtained by adding the discharged electrical quantity $D_{2n}$ in step S24 to the discharged electrical quantity $D_{2n-1}$ in step S22.

The judgment portion 42 judges whether the second accumulated discharged electrical quantity D exceeds a second setting value $D_2$ (step S26). Here, the second setting value $D_2$ is set in advance by the judgment portion 42 for example, and is the second accumulated discharged electrical quantity when, in the second region, the life of the lead-acid battery comes to an end.

When the second accumulated discharged electrical quantity D exceeds the second setting value $D_2$ (YES in step S26), a notification portion 6 (see FIG. 10) issues a notification that the life has come to an end (step S27: notification step). The end-of-life notification notifies the user that the life of the lead-acid battery has come to an end by, for example, causing the notification portion 6 to light an LED.

On the other hand, when the second accumulated discharged electrical quantity is less than the second setting value $D_2$ (NO in step S26), the processing described below is repeated. The control portion 43 performs charging such that the charged electrical quantity $C_{2n}$ in the charge cycle is the electrical quantity equal to the product of the discharged electrical quantity $D_{2n-1}$ in the immediately preceding discharge cycle and the coefficient $R_2$ (step S22). When, in the discharge cycle immediately following this charging, an arbitrary discharged electrical quantity $D_{2n}$ is discharged (step S23), the second computation portion 44 computes the charged electrical quantity $C_{2n}$ and the accumulated charged electrical quantity up to that time (step S24). Further, the discharged electrical quantity $D_{2n}$ and the second accumulated discharged electrical quantity up to that time are computed (step S25). And the judgment portion 42 judges whether the second accumulated discharged electrical quantity obtained exceeds the second setting value $D_2$ (step S26). The above processing is repeated until the second ac discharged electrical quantity is judged to have exceeded the second setting value $D_2$.

As explained above, the control portion 43 controls the charged electrical quantity in the first region such that the first entire charged electrical quantity $C_1$ in the first region is the electrical quantity equal to the product of first setting value $D_1$, which is the boundary between the first region and the second region, and the first value $R_1$ set in advance. Further, the control portion 43 controls the charged electrical quantity in the second region such that the second entire charged electrical quantity $C_2$ in the second region is the electrical quantity equal to the product of the second setting value $D_2$, which is the second accumulated discharged electrical quantity when the life of the lead-acid battery in the second region comes to an end, and the second value $R_2$, set in advance to a value smaller than the first value $R_1$.

Therefore the proportion of the accumulated value of the charged electrical quantity in the entire second region to the accumulated value of the discharged electrical quantity in the second region is smaller than the proportion of the accumulated value of the charged electrical quantity in the entire first region to the accumulated value of the discharged electrical quantity in the entire first region. Hence in contrast with the first region, in which it is preferable that the ratio of the average charged electrical quantity for each charge cycle to the average discharged electrical quantity for each discharge cycle be large, in the second region the ratio of the average charged electrical quantity for each charge cycle to the average discharged electrical quantity for each discharge cycle is smaller than in the first region. By this means, the decline in the electrical quantity which can be charged/discharged due to overcharging can be reduced in the second region.

Figure 3:
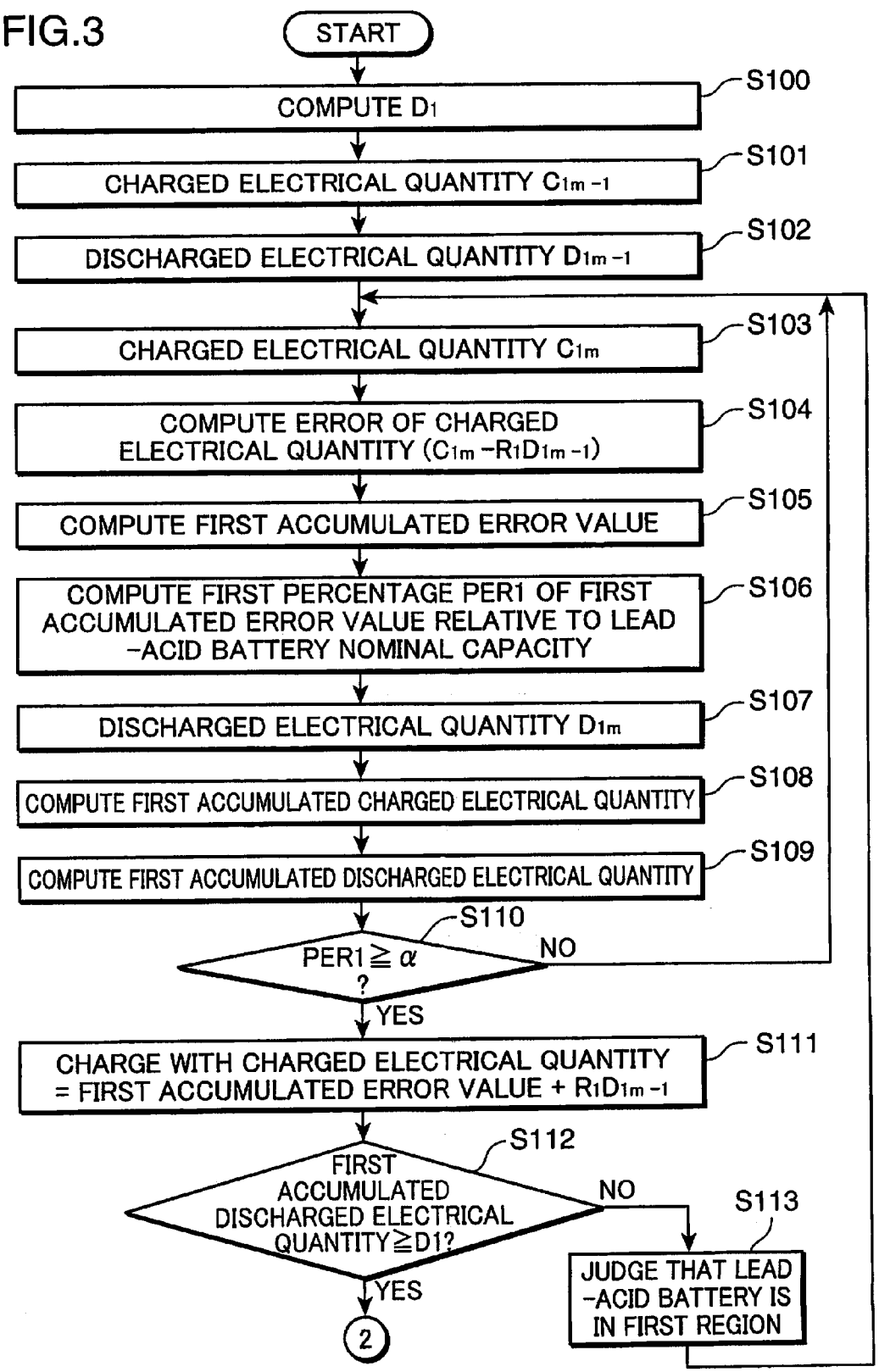
FIG. 3 is a flowchart showing still another example of the method of controlling a lead-acid battery of one embodiment of the invention.
Figure 4:
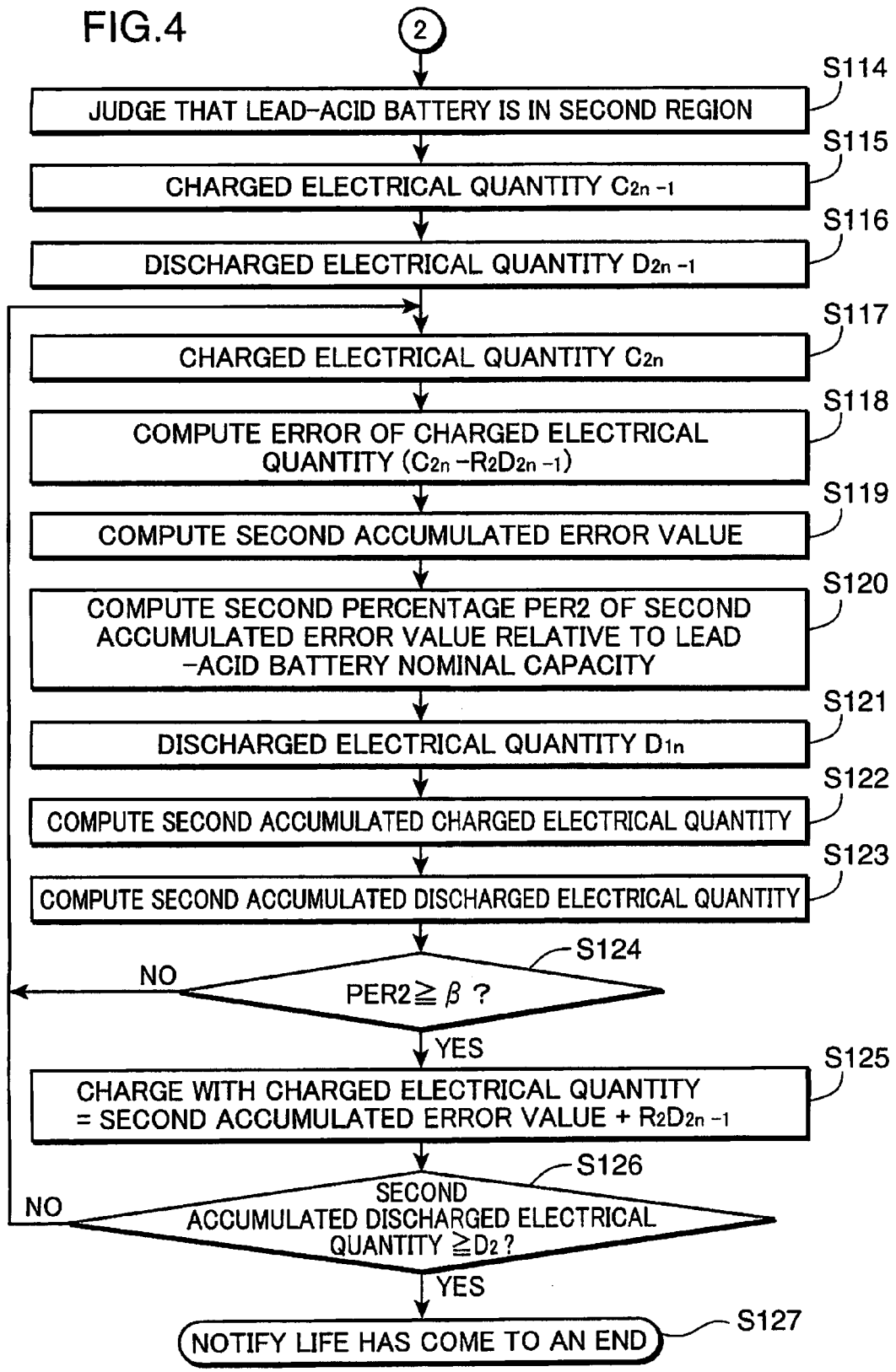
FIG. 4 is a flowchart showing still another example of the method of controlling a lead-acid battery of one embodiment of the invention.

FIG. 3 and FIG. 4 are flowcharts showing other examples of the control method of the first embodiment. When the lead-acid battery which is a power supply is used starting from an unused state, a first setting value $D_1$ is computed (step S100). And, the lead-acid battery is charged with an arbitrary charged electrical quantity $C_{1m-1}$ in the charging of step S101, is discharged with an arbitrary discharged electrical quantity $D_{1m-1}$ (where $C_{1m-1} > D_{1m-1}$) in step S102, and is charged with an arbitrary charged electrical quantity $C_{1m}$ in step S103.

And, a first error computation portion 45 (see FIG. 11) computes the error obtained by subtracting, from the charged electrical quantity $C_{1m}$, the electrical quantity (first reference discharged electrical quantity) equal to the product of the discharged electrical quantity $D_{1m-1}$ in the immediately preceding discharge cycle and a coefficient $R_1$ set in advance (step S104: first error computation step). A first accumulated error value computation portion 46 (see FIG. 11) successively accumulates the computed errors to compute a first accumulated error value (step S105: first accumulated error computation step). After the first accumulated error value has been computed, a first percentage computation portion 47 (see FIG. 11) computes a first percentage PER1, which is one example of the proportion of the first accumulated error value to the nominal capacity of the lead-acid battery (step S106: first proportion computation step).

And, discharge of an arbitrary discharged electrical quantity $D_{1m}$ is performed in step S107. Thereafter, the first computation portion 41 computes a first accumulated charged electrical quantity (step S108: first computation step). Further, the first computation portion 41 computes a first accumulated discharged electrical quantity (step S109: first computation step). For example, the first accumulated discharged electrical quantity after performing the discharges of steps S102 and S107 is the accumulated discharged electrical quantity obtained by adding the discharged electrical quantity $D_{1m}$ in step S107 to the discharged electrical quantity $D_{1m-1}$ in step S102.

The judgment portion 42 judges whether the first percentage PER1 exceeds a threshold value (first threshold value) a set in advance (step S110). If the first percentage PER1 is less than the threshold value α (NO in step S110), then the processing of steps S103 to S109 is repeated until the first percentage exceeds the threshold value α.

If on the other hand it is judged that the first percentage PER1 exceeds the threshold value α (YES in step S110), the control portion 43 performs charging with the charged electrical quantity obtained by adding, to the first accumulated error value at this time, the electrical quantity equal to the product of the discharged electrical quantity $D_{1m-1}$ in the initial discharge and the coefficient $R_1$ set in advance (step S111).

Thereafter, the judgment portion 42 judges whether the first accumulated discharged electrical quantity up to that time exceeds the first setting value $D_1$ (step S112: judgment step). If the first accumulated discharged electrical quantity is less than the first setting value $D_1$ (NO in step S112), the judgment portion 42 judges that the life cycle of the lead-acid battery is at the present time in the first region (step S113). Thereafter, the processing of steps S103 to S111 are repeated until the first accumulated discharged electrical quantity exceeds the first setting value $D_1$.

On the other hand, when it is judged that the first accumulated discharged electrical quantity D exceeds the first setting value $D_1$ (YES in step S111), the judgment portion 42 judges that the life cycle of the lead-acid battery is at the present time in the second region (step S114).

Thereafter, charging with an arbitrary charged electrical quantity $C_{2n-1}$ in step S115, discharging of an arbitrary discharged electrical quantity $D_{2n-1}$ in step S116, and charging with an arbitrary charged electrical quantity $C_{2n}$ in step S117, are performed.

And, a second error computation portion 48 (see FIG. 11) computes an error obtained by subtracting, from the charged electrical quantity $C_{2n}$, the electrical quantity (second reference discharged electrical quantity) which is the product of the discharged electrical quantity $D_{2n-1}$ in the immediately preceding discharge cycle and a coefficient $R_2$ set in advance to be smaller than the value of the coefficient $R_1$ (step S118: second error computation step). The computed errors are successively accumulated by a second accumulated error value computation portion 49 (see FIG. 11) to compute a second accumulated error value (step S119: first accumulated error value computation step). After computing the second accumulated error value, a second percentage computation portion 50 (see FIG. 11) computes a second percentage PER2, which is an example of the proportion of the second accumulated error value to the nominal capacity of the lead-acid battery (step S120: second proportion computation step).

And, discharge of an arbitrary discharged electrical quantity $D_{21}$ is performed in step S121. Thereafter, the second computation portion 44 computes the second accumulated charged electrical quantity (step S122: second computation step). Further, the second computation portion 44 computes the second accumulated discharged electrical quantity (step S123: second computation step). The processing described above is repeated until, in step S124, it is judged that the second percentage PER2 exceeds a threshold value (second threshold value) β set in advance.

In step S123, if it is judged that the second percentage PER2 exceeds the threshold value β set in advance, the control portion 43 performs charging with a charged electrical quantity obtained by adding, to the second accumulated error value at this time, the electrical quantity equal to the product of the discharged electrical quantity $D_{2n-1}$ in the initial discharge and the coefficient $R_2$ set in advance (step S125).

Thereafter, the judgment portion 42 judges whether the second accumulated discharged electrical quantity up to that time exceeds the second setting value $D_2$ (step S126). If it is judged that the second accumulated discharged electrical quantity exceeds the second setting value $D_2$ (YES in step S126), the notification portion 6 issues a notification that the life has come to an end (step S127). On the other hand, if it is judged that the second accumulated discharged electrical quantity is less than the second setting value $D_2$ (NO in step S126), the processing of steps S117 to S125 is repeated until it is judged that the second accumulated discharged electrical quantity exceeds the second setting value $D_2$.

Here, the activity of active material in the second region is lower than the activity of active material in the first region, so that from the standpoint of preventing the occurrence of overcharging, it is desirable that the second accumulated error value be small, in contrast with the first accumulated error value. For this reason, it is preferable that the threshold value β be a smaller value than the threshold value α.

As explained above, in the processing described in the flowcharts of FIG. 1 and FIG. 2, upon each charging in the first region, charging is performed using a charged electrical quantity equal to the product of the discharged electrical quantity in the immediately preceding discharge cycle and the coefficient $R_1$. On the other hand, upon each charging in the second region, charging is performed using a charged electrical quantity equal to the product of the discharged electrical quantity in the immediately preceding discharge cycle and the coefficient $R_2$ smaller than the coefficient $R_1$.

Hence in the processing described in the flowcharts of FIG. 1 and FIG. 2, in contrast with the first region, in which it is preferable that the ratio of the charged electrical quantity of each charge cycle to the discharged electrical quantity of each discharge cycle be high, in the second region the ratio of the charged electrical quantity of each charge cycle to the discharged electrical quantity of each discharge cycle is lower than the ratio in the first region. By this means, the decline in the electrical quantity which can be charged/discharged due to overcharging can be reduced in the second region.

Further, in the processing described in the flowcharts of FIG. 3 and FIG. 4, charging is performed in the first region such that each time the first percentage, which is one example of a proportion of the first accumulated error value to the nominal capacity of the lead-acid battery, exceeds the threshold value α, the first accumulated error value at this time is the charged electrical quantity. On the other hand, charging is performed in the second region such that each time the second percentage, which is one example of a proportion of the second accumulated error value to the nominal capacity of the lead-acid battery, exceeds the threshold value β, the second accumulated error value at this time is the charged electrical quantity.

Hence the processing described in the flowcharts of FIG. 3 and FIG. 4 differs from the processing described in the flowcharts of FIG. 1 and FIG. 2 in which the charged electrical quantity is controlled in each charge cycle, in that the charged electrical quantity is controlled upon execution every certain number of times of the charge cycle, and so there is the advantage that convenience to the user is improved.

The control method according to the flowcharts of FIG. 1 and FIG. 2 enables management such that, in the first region, the charged electrical quantity in each charge cycle is an electrical quantity equal to the product of the discharged electrical quantity in the discharge cycle immediately preceding the charge cycle and an appropriate coefficient $R_1$. Further, the control method according to the flowcharts of FIG. 1 and FIG. 2 enables management such that, in the second region, the charged electrical quantity in each charge cycle is an electrical quantity equal to the product of the discharged electrical quantity in the discharge cycle immediately preceding the charge cycle and an appropriate coefficient $R_2$. Hence this control method is preferable as means for preventing a decline in the electrical quantity by which the lead-acid battery can be charged/discharged.

However, in an electric-powered vehicle in which a lead-acid battery is used as a power supply, when for example a case is supposed in which short charging (for approximately several tens of minutes) is repeated during driver rest periods in the daytime, and long charging (for approximately several hours) is performed in the nighttime, it is difficult to perform charging each time so as to satisfy the flowcharts of FIG. 1 and FIG. 2 (that is, charging such that the charged electrical quantity $C_{1m}$ is equal to the product of the preceding discharged electrical quantity $D_{1m-1}$ and the coefficient $R_1$). In this case, management is performed such that the first entire charged electrical quantity $C_1$ is equal to the product of the first setting value $D_1$ and the coefficient $R_1$, and moreover such that the second entire charged electrical quantity $C_2$ is equal to the product of the second setting value $D_2$ and the coefficient $R_2$, as shown in FIG. 3 and FIG. 4; by this means, although not obtained to the same extent as the control method according to the flowcharts of FIG. 1 and FIG. 2 in which each charging is performed using a charged electrical quantity obtained as the product of the discharged electrical quantity of the immediately preceding discharge cycle and a coefficient, nonetheless the advantageous results of the first embodiment are obtained.

The first setting value $D_1$ used in the processing described in the flowcharts of FIG. 1 to FIG. 4 is for example computed by the processing described below.

Figure 5:
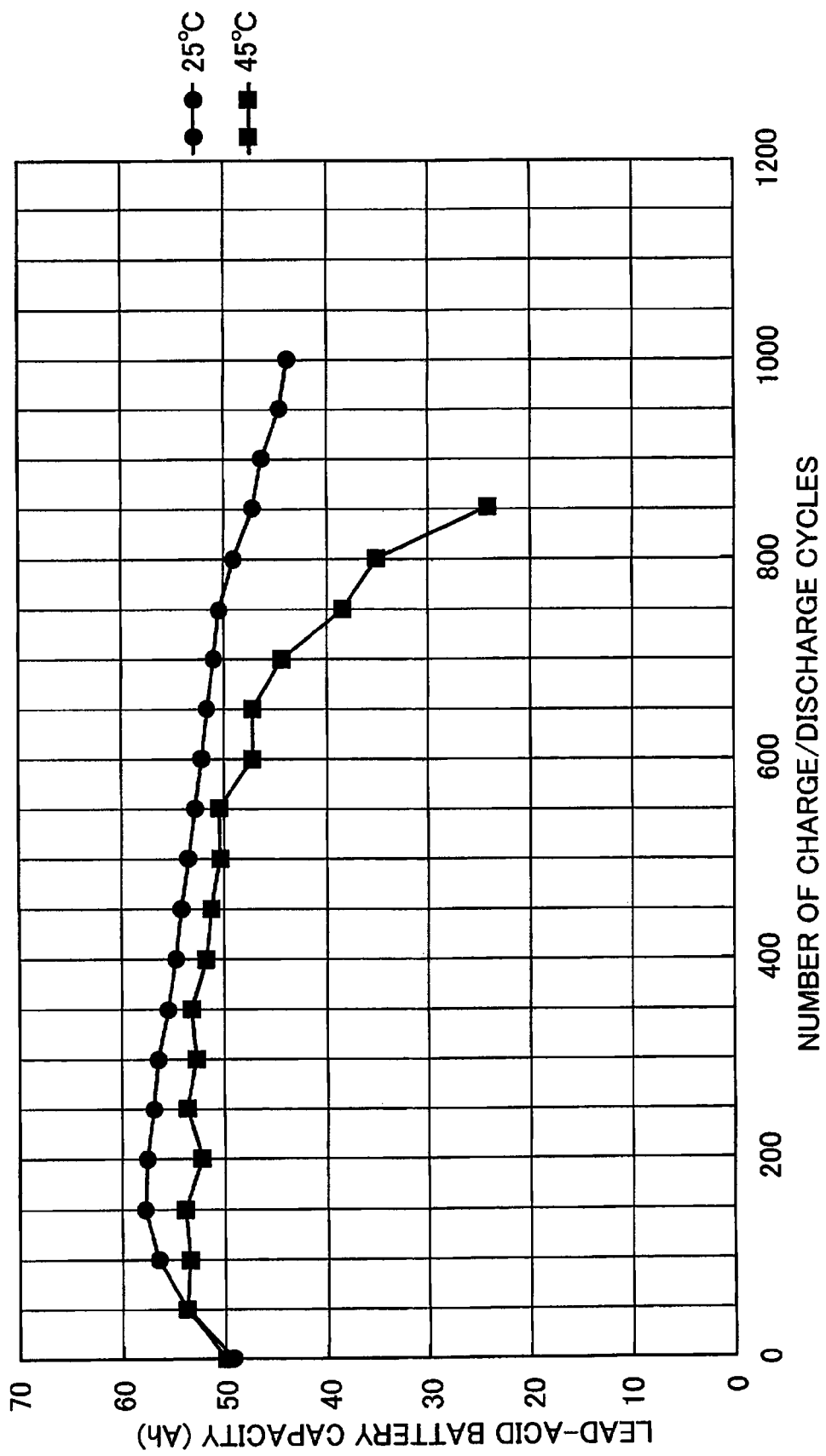
FIG. 5 shows an example of correlation between number of charge/discharge cycles of a lead-acid battery and the lead-acid battery capacity.

A storage portion 40 (see FIG. 11) stores data representing the correlation between the number of charge/discharge cycles and the lead-acid battery capacity, such as shown in FIG. 5. FIG. 5 shows an example of the correlation between the number of charge/discharge cycles and the capacity of a lead-acid battery.

This correlation example was obtained by performing, in each charge/discharge cycle, discharge at a discharge current of 20 A and discharged electrical quantity of 48 Ah, and subsequent five-stage constant-current charging, of a lead-acid battery with a nominal capacity of 50 Ah under conditions of surface temperatures of both 25° C. and 45° C.

Figure 6:
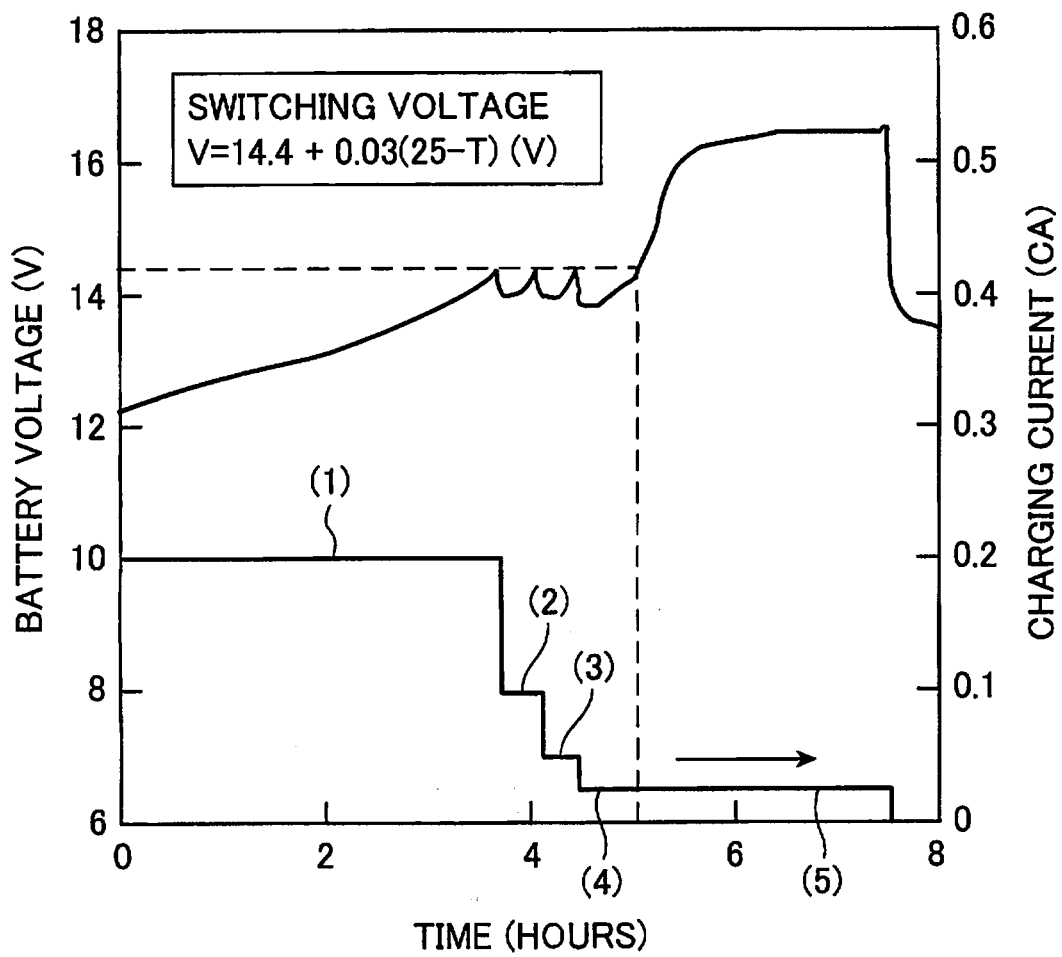
FIG. 6 shows an example of five-stage constant-current charging control from a state in which the DOD (Depth Of Discharge: proportion of discharge quantity to rated capacity) is 80%.

Here, five-stage constant-current charging is explained. FIG. 6 shows an example of five-stage constant-current charging control from a state in which the DOD (Depth Of Discharge: the ratio of the discharge quantity to the rated capacity) is 80%. In the figure, "CA" is the reciprocal of the time rate.

As shown in FIG. 6, after charging is started at a first charging current (1), each time the battery voltages reaches a switching voltage V (V=14.4+0.03(25−T), where T is the battery surface temperature), the charging current is successively reduced to a second charging current (2), third charging current (3), and fourth charging current (4).

Here, if the battery voltage exceeds the switching voltage V, the charging reaction causes such secondary reactions as electrolyte decomposition and positive electrode grid corrosion to be accelerated. Hence as stated above, the charging current is decreased in stages each time the battery voltage reaches a switching voltage V.

And, after charging has been performed using the fourth charging current (4), when the battery voltage reaches the switching voltage V, the charging current is switched from the fourth charging current (4) to a fifth charging current (5). In the example of FIG. 6, the fifth charging current (5) has the same current value as the fourth charging current (4).

Charging after the charging current is switched to the fifth charging current (5) is performed in a state in which the battery voltage is not limited. That is, as indicated in the drawings, when the battery voltage rises above the switching voltage V, charging is performed at the fifth charging current (4) for a predetermined time (for example, 2.5 hours). Then charging ends.

Charging at this fifth charging current (5) is charging in order to bring the battery to a fully charged state. Hence it is preferable that the state be such that the charged electrical quantity is between 107% and 115% of the discharged electrical quantity. Hence charging at the fifth charging current (5) is continued even after the battery voltage rises above the switching voltage V.

As is clear from the correlation example shown in FIG. 5, in a case in which the surface temperature of the lead-acid battery is 25° C., when the number of charge/discharge cycles is 150, a capacity for the lead-acid battery of approximately 58 Ah, which is the peak value, is obtained. Hence it is seen that the 150th charge/discharge cycle included in the discharge cycles obtained for the 58 Ah capacity of the lead-acid battery, which is a peak value, is a charge/discharge cycle at which the capacity of the lead-acid battery is the maximum capacity $CA_{max}$.

Hence when the surface temperature of the lead-acid battery is 25° C., a microcomputer 4 sets, as the first setting value $D_1$, the discharged electrical quantity (7200 Ah) obtained as the product of the number of charge/discharge cycles (150) and the discharged electrical quantity (48 Ah) in one charge/discharge cycle.

In the case in which the surface temperature of the lead-acid battery is 45° C., when the number of charge/discharge cycles is 50, a capacity for the lead-acid battery of approximately 54 Ah, which is the peak value, is obtained. Hence in the case in which the surface temperature is 45° C., the microcomputer 4 sets, as the first setting value $D_1$, the discharged electrical quantity (2400 Ah) obtained as the product of the number of charge/discharge cycles (50) and the discharged electrical quantity (that is, 48 Ah) in one charge/discharge cycle.

A second embodiment is characterized in that, in the first embodiment, the coefficient $R_1$ is set to a value in the range from 1 to 1.5, the coefficient $R_2$ is set to a value in the range from 0.9 to 1.25, and moreover the ratio $R_1/R_2$ of the coefficients $R_1$ and $R_2$ is such that $1 < R_1/R_2 \leq 1.66$.

FIG. 7 shows the charging efficiency of a valve-regulated lead-acid battery; FIG. 7A shows the charging efficiency in the first region, and FIG. 7B shows the charging efficiency in the second region.

As is clear from FIG. 7A, when in the first region the ratio of the actual charged electrical quantity to the lead-acid battery capacity (horizontal axis) exceeds 80%, a deviation from the ratio of the actual discharged electrical quantity to the lead-acid battery capacity (vertical axis) occurs, and the charging efficiency (the ratio of the actual discharged electrical quantity to the actual charged electrical quantity) gradually declines; hence in order to adequately raise the ratio of the actual discharged electrical quantity to the lead-acid battery capacity (vertical axis), the ratio of the actual charged electrical quantity to the lead-acid battery capacity (horizontal axis) must be made 100% or higher.

When charging of the lead-acid battery is started from various SOCs, in order to make the ratio of the actual charged electrical quantity to the lead-acid battery capacity (horizontal axis) equal to or greater than 100%, the charged electrical quantity in each charge cycle must be made greater than the discharged electrical quantity in the discharge cycle immediately preceding the charge cycle. To this end, the value $R_1$ multiplied by each charged electrical quantity is made equal to or greater than 1.

On the other hand, when the ratio of the actual charged electrical quantity to the lead-acid battery capacity (horizontal axis) exceeds 110%, true overcharging begins. At this time, not only is the charged electrical quantity substantially no longer reflected in the discharged electrical quantity, but by repeating true overcharging, corrosion of the positive electrode grid is accelerated, and there is a prominent decline in the electrical quantity which can be charged/discharged. Also, when the ratio of the actual charged electrical quantity to the lead-acid battery capacity (horizontal axis) exceeds 150%, not only does true overcharging occur, but the lift of the lead-acid battery is prominently shortened.

As a result of experiments in which charging was performed from various SOCs, the inventors found that if the value of $R_1$ is 1.5 or less, prominent shortening of the life of the lead-acid battery can be suppressed. Hence when starting charging from various SOCs, in order to suppress prominent shortening of the lead-acid battery life, it is preferable that the value of $R_1$ be 1.5 or less.

On the other hand, excess charged electrical quantities (that is, overcharge electrical quantities) occurring when the ratio of the discharged electrical quantity to the lead-acid battery capacity is 90% are larger in the second region than in the first region, as is clear from a comparison of the range of the horizontal axis indicated by the arrows A in FIG. 7A and the range of the horizontal axis in FIG. 7B.

As a result of experiments with the value of $R_2$ set to various values in the second region, the inventors found that an excess charged electrical quantity (the range of the horizontal region indicated by the arrows in FIG. 7B) is the lowest-limit electrical quantity. Hence in the second region, in order to make an excess charged electrical quantity the lowest-limit electrical quantity, it is desirable that the range of $R_2$ be from 0.9 to 1.25.

Also, as a result of experiments performed with the value of $R_1$ varied in the range 1 to 1.5 while varying the value of $R_2$ in the range 0.9 to 1.25, the inventors found that if the ratio $R_1/R_2$ of the values of $R_1$ and $R_2$ is such that $1 < R_1/R_2 \leq 1.66$, then the proportion of the accumulated value of the charged electrical quantity in the entire second region to the accumulated value of the discharged electrical quantity in the entire second region is smaller than the ratio of the accumulated value of the charged electrical quantity in the entire first region to the accumulated value of the discharged electrical quantity in the entire first region. Hence it is preferable that the ratio $R_1/R_2$ of the values of $R_1$ and $R_2$ be such that $1 < R_1/R_2 = 1.66$.

A third embodiment is characterized in that, in the second embodiment, every time charge/discharge cycles are repeated in the first region a number of times $P_1$ set in advance, the charged electrical quantity in the charge cycle immediately following is made a charged electrical quantity such that the value $R_{P1}$ obtained by dividing the first accumulated charged electrical quantity after execution of the charge cycle immediately following by the first accumulated discharged electrical quantity at this time is a value within the range 1 to 1.5.

Further, a fourth embodiment is characterized in that, in the second embodiment, every time charge/discharge cycles are repeated in the second region a number of times $P_2$ set in advance, the charged electrical quantity in the charge cycle immediately following is made a charged electrical quantity such that the value $R_{P2}$ obtained by dividing the second accumulated charged electrical quantity after execution of the charge cycle immediately following by the second accumulated discharged electrical quantity at this time is a value within the range 1 to 1.5.

Figure 8:
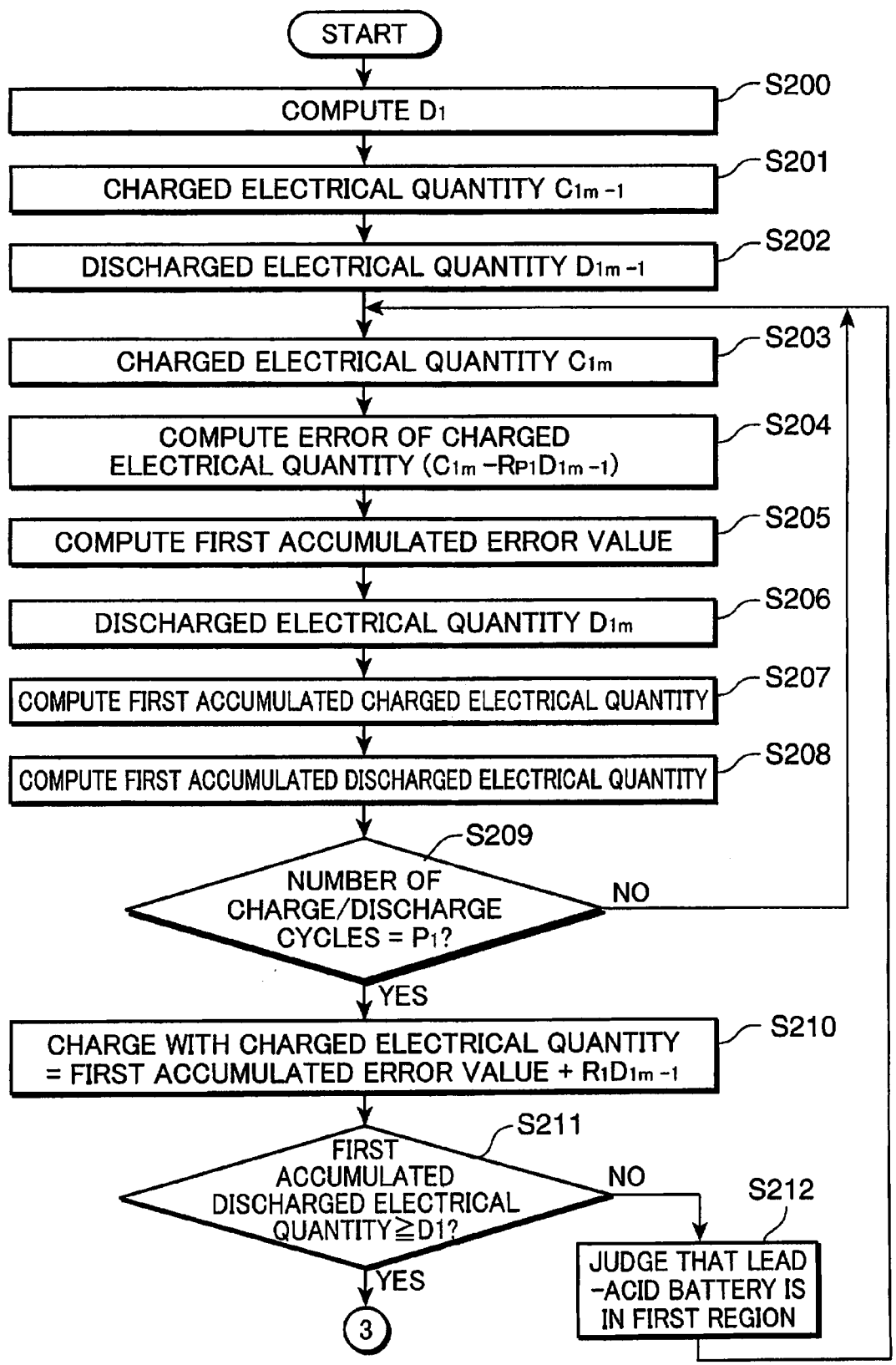
FIG. 8 is a flowchart showing still another example of the method of controlling a lead-acid battery of one embodiment of the invention.
Figure 9:
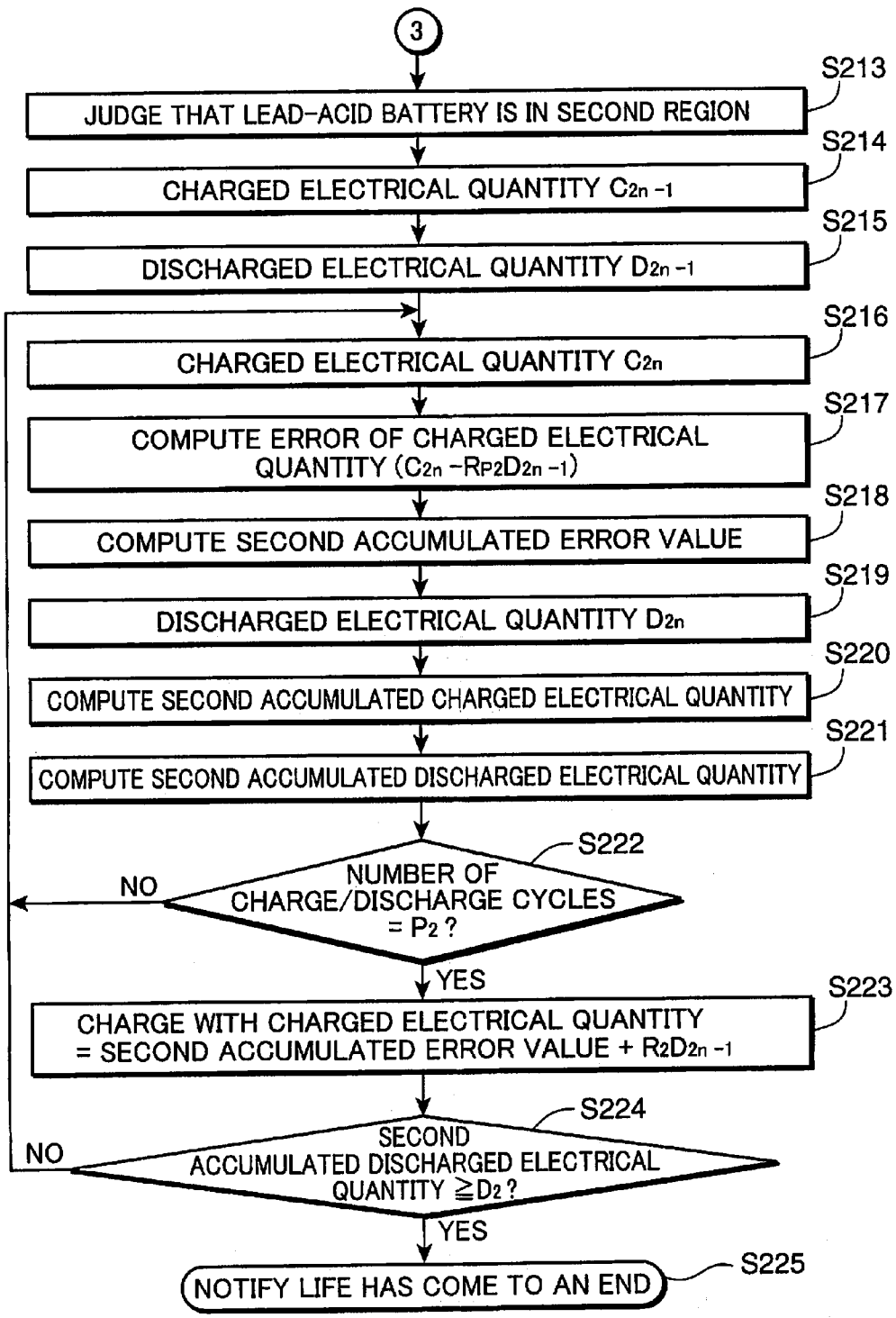
FIG. 9 is a flowchart showing still another example of the method of controlling a lead-acid battery of one embodiment of the invention.

FIG. 8 and FIG. 9 are flowcharts showing examples of the control methods of the third and fourth embodiments.

When the lead-acid battery which is a power supply is used starting from an unused state, a first setting value $D_1$ is computed (step S200). And, the lead-acid battery is charged with an arbitrary charged electrical quantity $C_{1m-1}$ in the charging of step S201, is discharged with an arbitrary discharged electrical quantity $D_{1m-1}$ (where $C_{1m-1} > D_{1m-1}$) in step S202, and is charged with an arbitrary charged electrical quantity $C_{1m}$ in step S203.

And, a first error computation portion 45 (see FIG. 11) computes the error obtained by subtracting, from the charged electrical quantity $C_{1m}$, the electrical quantity (first reference discharged electrical quantity) equal to the product of the discharged electrical quantity $D_{1m-1}$ in the immediately preceding discharge cycle and a coefficient $R_{p1}$ set in advance (step S204: first error computation step). A first accumulated error value computation portion 46 (see FIG. 11) successively accumulates the computed errors to compute a first accumulated error value (step S205: first accumulated error computation step).

And, discharge of an arbitrary discharged electrical quantity $D_{1m}$ is performed in step S206. Thereafter, the first computation portion 41 computes a first accumulated charged electrical quantity (step S207: first computation step). Further, the first computation portion 41 computes a first accumulated discharged electrical quantity (step S208: first computation step). For example, the first accumulated discharged electrical quantity after performing the discharges of steps S202 and S206 is the accumulated discharged electrical quantity D obtained by adding the discharged electrical quantity $D_{1m}$ in step S206 to the discharged electrical quantity $D_{1m-1}$ in step S202.

The control portion 43 judges whether the number of charge/discharge cycles up to this time exceeds a number $P_1$ set in advance (for example, a number in the range from 2 to 20) (step S209). If the number of charge/discharge cycles is less than $P_1$ (NO in step S209), the processing of steps S203 to S208 is repeated until the number of charge/discharge cycles is judged to exceed the number $P_1$.

Here, the control portion 43 counts the number of charge/discharge cycles, each comprising a charge cycle and the immediately following discharge cycle, and each time the processing of steps S209 and S211 is performed, the number of charge/discharge cycles counted up to that time is reset, and the number of charge/discharge cycles is begun once again (counting step).

On the other hand, when it is judged that the number of charge/discharge cycles has exceeded the number $P_1$ (YES in step S209), the control portion 43 performs charging with the charged electrical quantity obtained by adding, to the first accumulated error value at this time, the electrical quantity obtained as the product of the discharged electrical quantity $D_{1m-1}$ in the initial discharge and the coefficient $R_1$ set in advance (step S210).

Thereafter, the judgment portion 42 judges whether the first accumulated discharged electrical quantity up to that time exceeds the first setting value $D_1$ (step S211: judgment step). If the first accumulated discharged electrical quantity is less than the first setting value $D_1$ (NO in step S211), the judgment portion 42 judges that the life cycle of the lead-acid battery is at the present time in the first region (step S212). And, the control portion 43 resets the number of charge/discharge cycles counted. The above processing is repeated until it is judged that the first accumulated discharged electrical quantity exceeds the first setting value $D_1$.

On the other hand, if it is judged that the first accumulated discharged electrical quantity D exceeds the first setting value $D_1$ (YES in step S211), the judgment portion 42 judges that the life cycle of the lead-acid battery is at the present time in the second region (step S213).

Thereafter, charging with an arbitrary charged electrical quantity $C_{2n-1}$ in step S214, discharging of an arbitrary discharged electrical quantity $D_{2n-1}$ in step S215, and charging with an arbitrary charged electrical quantity $C_{2n}$ in step S216, are performed.

And, a second error computation portion 48 (see FIG. 11) computes an error obtained by subtracting, from the charged electrical quantity $C_{2n}$, the electrical quantity (second reference discharged electrical quantity) which is the product of the discharged electrical quantity $D_{2n-1}$ in the immediately preceding discharge cycle and a coefficient $R_{p2}$ set in advance to be smaller than the value of the coefficient $R_{p1}$ (step S217: second error computation step). The computed errors are successively accumulated by a second accumulated error value computation portion 49 (see FIG. 11) to compute a second accumulated error value (step S218: second accumulated error value computation step).

And, discharge of an arbitrary discharged electrical quantity $D_{1n}$ is performed in step S219. Thereafter, the second computation portion 44 computes the second accumulated charged electrical quantity (step S220: second computation step). Further, the computation portion 41 computes the second accumulated discharged electrical quantity (step S221: second computation step). The processing described above is repeated until, in step S222, it is judged that the value representing the number of charge/discharge cycles up to that time exceeds a number $P_2$ set in advance (for example, a number in the range from 2 to 20).

Here, the control portion 43 counts the number of charge/discharge cycles, each comprising a charge cycle and the immediately following discharge cycle, and each time the processing of steps S222 and S224 is performed, the number of charge/discharge cycles counted up to that time is reset, and the number of charge/discharge cycles is begun once again (counting step).

When, in step S22, it is judged that the value representing the number of charge/discharge cycles up to that time exceeds the number $P_2$ set in advance, the control portion 43 performs charging with the charged electrical quantity obtained by adding, to the second accumulated error value at this time, the electrical quantity obtained as the product of the discharged electrical quantity $D_{2-1}$ in the initial discharge and the coefficient $R_2$ set in advance (step S223).

Thereafter, the judgment portion 42 judges whether the second accumulated discharged electrical quantity up to that time exceeds the second setting value $D_2$ (step S224). If the second accumulated discharged electrical quantity exceeds the second setting value $D_2$ (YES in step S224), a notification portion 6 issues a notification that the life has come to an end (step S225). On the other hand, if it is judged that the second accumulated discharged electrical quantity is less than the second setting value $D_2$ (NO in step S224), the processing of steps S216 to S223 is repeated until it is judged that the second accumulated discharged electrical quantity exceeds the second setting value $D_2$.

Following the flowcharts of FIG. 1 and FIG. 2, all charging can be made to conform to the performance of a lead-acid battery (for example, the charging acceptance of the lead-acid battery), so that the decline in electrical quantities which can be charged/discharged can be minimized; but causing all charging to strictly follow the flowcharts of FIG. 1 and FIG. 2 is not readily compatible with actual modes of use of a power supply system which uses a lead-acid battery as a power supply (for example, a driving power source of an electric vehicle). On the other hand, in order to suppress declines in the electrical quantities of a lead-acid battery to the extent possible, it is necessary to further improve the flowcharts of FIG. 3 and FIG. 4, which are simply made compatible with actual modes of use of power supply systems which use lead-acid batteries as power supplies.

Hence in the flowcharts of FIG. 8 and FIG. 9, every time charge/discharge cycles in the first region are repeated a number of times $P_1$ set in advance, the control portion 43 performs charging such that the first accumulated charged electrical quantity after execution of the immediately following charge cycle is a charged electrical quantity equal to the product of the first accumulated discharged electrical quantity at this time and a coefficient $R_{P1}$, set to a value in the range 1 to 1.5.

On the other hand, every time charge/discharge cycles in the second region are repeated a number of times $P_2$ set in advance, the control portion 43 performs charging such that the second accumulated charged electrical quantity after execution of the immediately following charge cycle is a charged electrical quantity equal to the product of the second accumulated discharged electrical quantity at this time and a coefficient $R_{P2}$, set to a value in the range 0.9 to 1.25. Hence the charged electrical quantity is controlled at a frequency conforming more closely to the mode of use of the lead-acid battery by the user.

Further, the coefficient $R_{p1}$ and the coefficient $R_{p2}$ are set such that the ratio $R_{p1}/R_{p2}$ of the coefficients $R_{p1}$ and $R_{p2}$ satisfies $1 < R_{p1}/R_{p2} \leq 1.66$.

The reasons for setting the coefficient $R_{P1}$ to a value in the range 1 to 1.5, for setting the coefficient $R_{P2}$ to a value in the range 0.9 to 1.25, and for setting the ratio $R_{p1}/R_{p2}$ of the coefficients $R_{p1}$ and $R_{p2}$ in the range $1 < R_{p1}/R_{p2} \leq 1.66$, are the same as the case for setting the values of the coefficients R1 and R2.

Here, in cases where the number of charge/discharge cycles used to calculate an accumulated value is less than two, when causing compatibility with the actual mode of use of the power supply system using a lead-acid battery as the power supply, convenience to the user is worsened (for example, an electric-powered vehicle cannot be moved until charging ends, and similar). Further, when the number of charge/discharge cycles used to calculate an accumulated value is greater than 20, effectively similarly to cases in which the flowcharts of FIG. 3 and FIG. 4 are used, a decline in the electrical quantities of the lead-acid battery becomes somewhat prominent.

A fifth embodiment is characterized in that, in the first embodiment, the ratio $D_{S1}/D_{max}$ of the maximum value $D_{max}$ and the first setting value $D_1$ is set within the range 20 to 200.

In lead-acid batteries in general, while depending on the electrolyte composition and other configuration conditions, it is known that $D_1/D_{max}$ is within the range 20 to 200. And, it is known that even when a lead-acid battery is not fully charged/discharged, the capacity of the lead-acid battery is the maximum value $D_{max}$ when the first accumulated discharged electrical quantity has reached the first setting value $D_1$. If these facts are ascertained, then by ascertaining the mass of the lead dioxide used in the lead-acid battery, the first setting value $D_1$ can be roughly estimated.

Here, the mass of the lead dioxide used in a lead-acid battery can be ascertained by disassembling the lead-acid battery and performing quantitative analysis.

A sixth embodiment is characterized in that, in the first embodiment, the configuration of the lead-acid battery is a valve-regulated type configuration. Charge/discharge of the lead-acid battery is accompanied by the capture and separation of sulfate ions ($SO_4^{2-}$) in the electrolyte into and from the active material. Compared with liquid-type configurations such as are used in self-starter applications in internal-combustion vehicles, a valve-regulated lead-acid battery has a reduced amount of electrolyte, so that the influence of the electrolyte on the above-described charge/discharge reactions is diminished, and the demarcation between the first region and the second region is clarified, so that the advantageous results of use of the control method of this embodiment are enhanced.

That is, by its principle of operation, a valve-regulated lead-acid battery is configured so as to cause oxygen gas generated at the positive electrode to be absorbed at the negative electrode. And, if the amount of electrolyte is excessive, the electrolyte obstructs the path of gas diffusion from the positive electrode to the negative electrode, so that absorption of oxygen gas at the negative electrode is impeded. Hence in a valve-regulated lead-acid battery, compared with a liquid-type lead-acid battery, the amount of electrolyte is limited to a smaller amount. Hence the capacity of the lead-acid battery fluctuates according to the activity of the active material of the positive electrode, rather than the amount of electrolyte. Consequently the demarcation between the first region and the second region, the boundary of which is the first setting value $D_1$ at which the active material of the activated positive electrode begins to lose activity, is clear, and the advantageous results of using the control method of this embodiment are enhanced.

A seventh embodiment is the embodiment described below.

Figure 10:
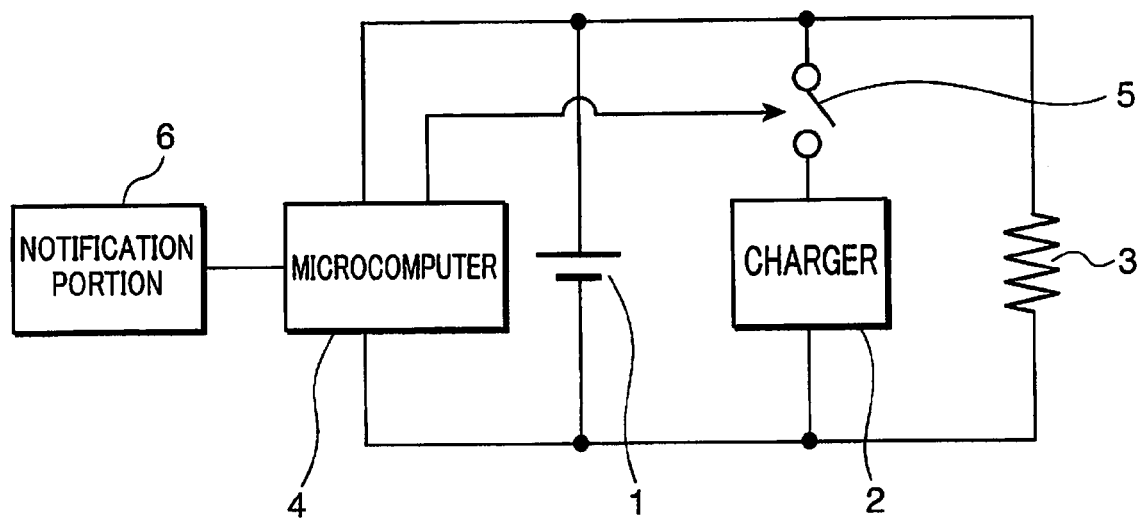
FIG. 10 is a block diagram showing one example of the power supply system of an embodiment of the invention.
Figure 11:
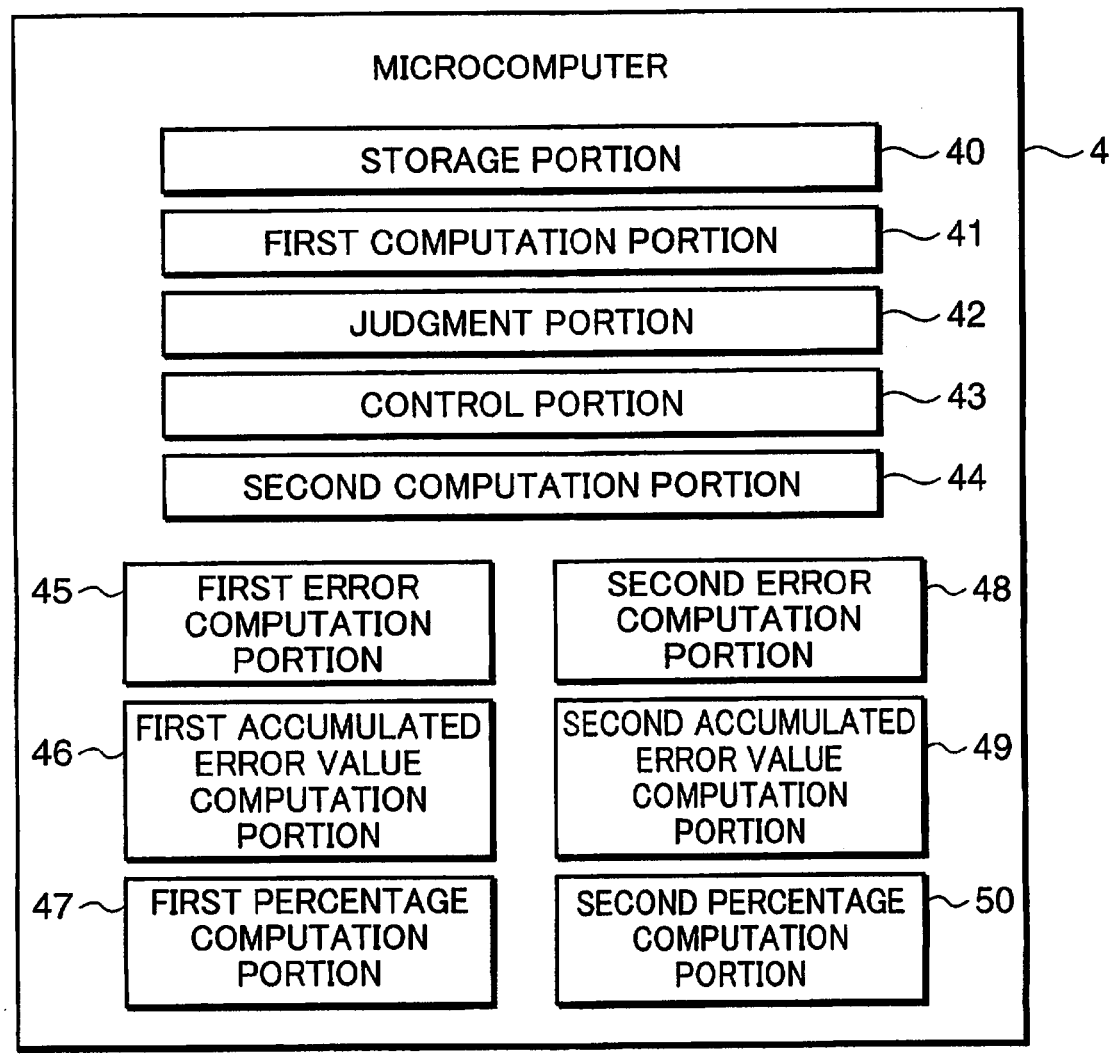
FIG. 11 is a block diagram showing one example of the function module of a microcomputer.

FIG. 10 is a block diagram showing one example of the power supply system of the seventh embodiment. FIG. 11 is a block diagram showing one example of a functional module of a microcomputer 4. A lead-acid battery 1 is electrically connected to a charger 2 which charges same and to a load 3 to which same is discharged. On the other hand, the lead-acid battery 1 is also connected to the microcomputer 4. The microcomputer 4 is connected to a notification portion 6. The notification portion 6 notifies the user when the life of the lead-acid battery comes to an end, by means of a voice message, display, or similar.

Here, the notification portion 6 may be directly connected to the microcomputer 4, but the notification portion 6 and the microcomputer 4 may also be connected via a Bluetooth (a registered trademark) or another wireless network, a wire network including optical communications, or via a telephone circuit or other existing information network.

By this means, information relating to the state of the lead-acid battery issued by the microcomputer 4 (for example, information indicating that the life of the lead-acid battery has come to an end), can be sent from the lead-acid battery 1 and microcomputer 4 to the notification portion 6 in a remote location, to provide notification.

Further, when such an information network is used, the number of lead-acid batteries 1, and the number of notification portions 6 which notify users of the states thereof, need not necessarily coincide; for example, a plurality of notification portions 6 may be associated with one lead-acid battery 1, so that each of the notification portions 6 are caused to provide notification of information relating to the state of the lead-acid battery 1. In this case, if the plurality of notification portions 6 are for example installed in a plurality of substations in which are stationed maintenance and inspection personnel for the lead-acid battery 1, when maintenance and inspection of a certain lead-acid battery 1 becomes necessary, maintenance and inspection personnel can be dispatched from a substation capable of responding to perform maintenance and inspection of the lead-acid battery 1.

Further, in such an embodiment, the notification portions 6 may for example be configured by portable telephone terminals or PHS terminals, which terminals maintenance and inspection personnel are made to carry, and information relating to the state of lead-acid batteries as well as position information for lead-acid batteries (hereafter called information relating to a lead-acid battery 1) may be sent to these terminals to provide notification.

Further, rather than sending information relating to lead-acid batteries 1 to all portable-type notification portions 6, position information for notification portions 6 measured using GPS signals, and the available work time of maintenance and inspection personnel, may be referenced to sent information relating to a lead-acid battery 1 and notify only the notification portion 6 carried by maintenance and inspection personnel in positions nearby the lead-acid battery 1 requiring maintenance or inspection, and who moreover have available work time. Further, a configuration may be employed in which information relating to a plurality of lead-acid batteries 1 is sent to a single notification portion 6 to provide notification. The above-described examples can be applied to such a configuration.

By means of the above, in a preferred configuration, when a lead-acid battery 1 requires some manner of attention, that is, when replacement or inspection operations are necessary, the state of the lead-acid battery 1 is notified by a notification portion 6, so that maintenance and inspection personnel having sufficient capability for response can respond promptly to each such lead-acid battery requiring attention.

As shown in FIG. 11, the microcomputer 4 comprises at least a storage portion 40, first computation portion 41, judgment portion 42, control portion 43, second computation portion 44, first error computation portion 45, first accumulated error value computation portion 46, first percentage computation portion (first proportion computation portion) 47, second error computation portion 48, second accumulated error value computation portion 49, and second percentage computation portion (second proportion computation portion) 50.

In addition to various programs used for operation of the microcomputer 4, the storage portion 40 stores the above-described first and second setting values $D_1$ and $D_2$. Further, the storage portion 40 stores the above-described coefficients $R_1$, $R_2$, $R_{p1}$, $R_{p2}$. And, the storage portion 40 stores the above-described threshold values $\alpha$ and $\beta$, and the numbers $P_1$ and $P_2$.

The first computation portion 41 computes the first accumulated charged electrical quantity by accumulating the charged electrical quantity for each charge cycle from the start of cycled use of the lead-acid battery, and in addition computes the first accumulated discharged electrical quantity by accumulating the discharged electrical quantity for each discharge cycle from the start of cycled use of the lead-acid battery.

The judgment portion 42 judges whether the life cycle of the lead-acid battery is at the present time in the first region or in the second region by comparing the first accumulated discharged electrical quantity determined by the first computation portion 41 with the contents of the storage portion 40. Further, the judgment portion 42 judges whether the computed first percentage (first proportion) exceeds the threshold value α set in advance. And, the judgment portion 42 judges whether the computed second percentage (second proportion) exceeds the threshold value β set in advance.

The control portion 43 performs various control processing described above. After the judgment portion 42 judges that the lead-acid battery is in the second region, the second computation portion 44 computes the second accumulated charged electrical quantity by accumulating the charged electrical quantity for each charge cycle in the second region, and computes the second accumulated discharged electrical quantity by accumulating the discharged electrical quantity for each discharge cycle in the second region.

Upon each execution of a charge cycle in the first region, the first error computation portion 45 computes the error obtained by subtracting, from the charged electrical quantity at the time of execution of the charge cycle, a first reference discharged electrical quantity, equal to the product of the discharged electrical quantity in the immediately preceding discharge cycle and a coefficient $R_1$ set in advance.

The first accumulated error value computation portion 46 computes a first accumulated error value, which is the accumulated value of errors in the first region by accumulating the errors upon each computation of error. The first percentage computation portion 47 computes a first percentage, which is the percentage of the first accumulated error value with respect to the nominal capacity of the lead-acid battery (first proportion).

Upon each execution of a charge cycle in the second region, the second error computation portion 48 computes the error obtained by subtracting, from the charged electrical quantity at the time of execution of the charge cycle, a second reference discharged electrical quantity, equal to the product of the discharged electrical quantity in the immediately preceding discharge cycle and a coefficient $R_2$ set in advance.

The second accumulated error value computation portion 49 computes a second accumulated error value, which is the accumulated value of errors in the second region by accumulating the errors upon each computation of error.

The second percentage computation portion 50 computes a second percentage, which is the percentage of the second accumulated error value with respect to the nominal capacity of the lead-acid battery (second proportion).

Further, the control portion 43 governs the opening and closing of a switch 5 connected in series to the charger 2. Control of the switch 5 by the control portion 43 is explained in detail using the flowcharts of FIG. 3 and FIG. 4. When charge/discharge cycles are begun in an unused lead-acid battery 1, until the first percentage PER1 exceeds the threshold value α, the processing of steps S103 to S109 is repeated; but in the charging of step S111 after the first percentage PER1 has exceeded the threshold value α, the control portion 43 does not randomly close the switch 5 and end charging from the charger 2, but closes the switch 5, and causes the end of charging from the charger 2 in step S111, when the charged electrical quantity becomes the charged electrical quantity obtained by adding, to the first accumulated error value when the first percentage PER1 has exceeded the threshold value α, the electrical quantity equal to the product of the discharged electrical quantity $D_{1m-1}$ in the immediately preceding discharge cycle and the coefficient $R_1$ set in advance. By repeating this charging, control can be performed such that the first entire charged electrical quantity is the electrical quantity equal to the product of the first entire discharged electrical quantity and the coefficient $R_1$ set in advance.

And, when in step S112 it is judged that the first accumulated discharged electrical quantity exceeds the first setting value $D_1$, the judgment portion 42 judges that the second region has begun (that the first region has ended).

In the second region, charging and discharging are repeated until the second percentage PER2 exceeds the threshold value β; in the charging of step S125 after the second percentage PER2 ahs exceeded the threshold value β, the control portion 43 does not randomly close the switch 5 and end charging from the charger 2, but closes the switch 5, and causes the end of charging from the charger 2, when the charged electrical quantity becomes the charged electrical quantity obtained by adding, to the second accumulated error value when the second percentage PER2 has exceeded the threshold value β, the electrical quantity equal to the product of the discharged electrical quantity $D_{2n-1}$ in the immediately preceding discharge cycle and the coefficient $R_2$ set in advance. By repeating this charging, control can be performed such that the second entire charged electrical quantity is the electrical quantity equal to the product of the second entire discharged electrical quantity and the coefficient $R_2$ set in advance.

And, when step S121 which is the final discharge ends, and it is judged that the second entire discharged electrical quantity exceeds the second setting value $D_2$, the judgment portion 42 judges that the second region has ended (that the lead-acid battery has reached its limit of use). The advantageous results of the seventh embodiment are similar to the advantageous results of the first embodiment.

An eighth embodiment is characterized in that, in the seventh embodiment, the storage portion 40 stores a coefficient $R_1$ with value in the range 1 to 1.5, a coefficient $R_2$ with value in the range 0.9 to 1.25, and the fact that the ratio $R_1/R_2$ of the coefficients $R_1$ and $R_2$ is such that $1<R_1/R_2 \leq 1.66$. The advantageous results of the eighth embodiment are similar to the advantageous results of the second embodiment.

A ninth embodiment is characterized in that, in the seventh embodiment, the ratio $D_1/D_{max}$ of the maximum value $D_{max}$ and the first setting value $D_1$ is a value in the range 20 to 200. The advantageous results of the ninth embodiment are similar to the advantageous results of the fifth embodiment.

A tenth embodiment is characterized in that, in the seventh embodiment, the configuration of the lead-acid battery 1 is a valve-regulated configuration. The advantageous results of the tenth embodiment are similar to the advantageous results of the sixth embodiment.

An eleventh embodiment is the embodiment described below.

The configuration of the power supply system of the eleventh embodiment is similar to the block diagrams of FIG. 10 and FIG. 11. Below, a detailed description is given using the flowcharts of FIG. 8 and FIG. 9, centering on opening and closing of the switch 5, operation of which differs from that of the power supply system of the seventh embodiment.

In the eleventh embodiment, when in the first region the number of charge/discharge cycles reaches a prescribed number $P_1$ within the range from 2 to 20 (YES in step S209), the charging of step S210 is performed. In this charging, the control portion 43 does not randomly close the switch 5 and end charging from the charger 2, but closes the switch 5, and causes the end of charging from the charger 2 in step S210, when the charged electrical quantity becomes the charged electrical quantity obtained by adding, to the first accumulated error value when the number of charge/discharge cycles has reached the number $P_1$, the electrical quantity equal to the product of the discharged electrical quantity $D_{1m-1}$ in the immediately preceding discharge cycle and the coefficient $R_1$ set in advance. By performing this charging, control of the charged electrical quantity in the first region can be performed with a higher frequency than in the seventh embodiment, in which charged electrical quantity control is performed after the first percentage PER1 exceeds the threshold value α.

Further, when in the second region the number of charge/discharge cycles reaches the prescribed number $P_2$ in the range from 2 to 20 (YES in step S222), the charging of step S223 is performed. In this charging, the control portion 43 does not randomly close the switch 5 and end charging from the charger 2, but closes the switch 5, and causes the end of charging from the charger 2 in step S223, when the charged electrical quantity becomes the charged electrical quantity obtained by adding, to the second accumulated error value when the number of charge/discharge cycles has reached the prescribed number $P_2$ in the range 2 to 20, the electrical quantity equal to the product of the discharged electrical quantity $D_{2n-1}$ in the immediately preceding discharge cycle and the coefficient $R_2$ set in advance. By performing this charging, control of the charged electrical quantity in the second region can be performed with a higher frequency than in the seventh embodiment, in which charged electrical quantity control is performed after the second percentage PER2 exceeds the threshold value β.

The advantageous results of the eleventh embodiment are similar to the advantageous results of the first, third, and fourth embodiments.

A twelfth embodiment is characterized in that, in the eleventh embodiment, the storage portion 40 stores a coefficient $R_{p1}$ with value in the range 1 to 1.5, a coefficient $R_{p2}$ with value in the range 0.9 to 1.25, and the fact that the ratio $R_{p1}/R_{p2}$ of the coefficients $R_{p1}$ and $R_{p2}$ is such that $1 < R_{p1}/R_{p2} \leq 1.66$. The advantageous results of the twelfth embodiment are similar to the advantageous results of the combination of the first to fourth embodiments.

A thirteenth embodiment is characterized in that, in the eleventh embodiment, the ratio $D_1/D_{max}$ of the maximum value $D_{max}$ and the first setting value $D_1$ is a value in the range 20 to 200. The advantageous results of the thirteenth embodiment are similar to the advantageous results of the combination of the first, third, fourth, and fifth embodiments.

A fourteenth embodiment is characterized in that, in the eleventh embodiment, the configuration of the lead-acid battery 1 is a valve-regulated configuration. The advantageous results of the fourteenth embodiment are similar to the advantageous results of the combination of the first, third, fourth, and sixth embodiments.

An invention having the following configuration is principally included in the above-described specific embodiments.

The method of controlling a lead-acid battery according to one aspect of the invention is characterized in comprising a first computation step of computing a first accumulated charged electrical quantity by accumulating a charged electrical quantity for each charge cycle from the start of cycled use of a lead-acid battery, and of computing a first accumulated discharged electrical quantity by accumulating a discharge electrical quantity for each discharge cycle from the start of cycled use of the lead-acid battery; a judgment step of judging that the lead-acid battery is in a first region which is a partial region in a life cycle from the start of cycled use of the lead-acid battery until the life of the lead-acid battery ends, when the first accumulated discharged electrical quantity is less than a first setting value $D_1$ which is the first accumulated discharged electrical quantity obtained when, in a process of change of a capacity of the lead-acid battery occurring due to charge/discharge cycles of the lead-acid battery, the capacity is the maximum value $D_{max}$, and of judging that the lead-acid battery is in a second region which is a region after the first region and extends until the life of the lead-acid battery ends, when the first accumulated discharged electrical quantity exceeds the first setting value $D_1$; a second computation step of, after judging in the judgment step that the lead-acid battery is in the second region, computing a second accumulated charged electrical quantity by accumulating a charged electrical quantity for each charge cycle in the second region, and of computing a second accumulated discharged electrical quantity by accumulating a discharged electrical quantity for each discharge cycle in the second region; and a control step of controlling the charged electrical quantity in the first region such that a first entire charged electrical quantity $C_1$, which is the first accumulated charged electrical quantity at the end of the first region, is the electrical quantity equal to the product of the first setting value $D_1$ and a first value $R_1$ set in advance, and of controlling, after the lead-acid battery is judged to be in the second region, the charged electrical quantity in the second region such that a second entire charged electrical quantity $C_2$, which is the second accumulated charged electrical quantity when the life of the lead-acid battery comes to an end, is the electrical quantity equal to the product of the second setting value $D_2$, which is the second accumulated discharged electrical quantity when the life of the lead-acid battery comes to an end, and a second value $R_2$ set in advance to a value smaller than the first value $R_1$.

The first region defined in this method is the region in which a first accumulated charged electrical quantity, which is the accumulated value of the charged electrical quantity for each charge cycle from the start of cycled use of the lead-acid battery, is less than a first setting value $D_1$, which is the first accumulated discharged electrical quantity when the lead-acid battery capacity is the maximum value $D_{max}$ in the process of change of the capacity of the lead-acid battery occurring due to the passage of the lead-acid battery through charge/discharge cycles. In this first region, after charge/discharge cycles of the lead-acid battery are started, the active material of the positive electrode is activated, and the capacity of the lead-acid battery increases.

In this first region, lower oxides of lead (PbO, $PbO_x$ ($1 < x < 2$)), basic sulfates of lead (($PbO)_n PbSO_4$ (n=1 to 4)), and lead sulfate ($PbSO_4$) remaining in the active material of the positive electrode are converted into lead dioxide, and lead dioxide is activated, and it is thought that through expansion of the surface area thereof, the electrical quantity which can be discharged per unit mass of positive electrode active material steadily continues to increase. Further, in the first region the positive electrode active material is activated, so that of course the electrical quantity that can be charged also increases.

If the charged electrical quantity in this first region is insufficient (more specifically, if charge/discharge is continued in which charging is performed with a charged electrical quantity less than the immediately preceding discharged electrical quantity), then the above-described positive electrode active material activation is impeded, activity is lost, and the electrical quantity which can be charged/discharged continues to decline.

Hence it is necessary to control the charged electrical quantity in the first region such that the accumulated charged electrical quantity in the entire first region becomes an accumulated value equal to or greater than the accumulated value of the entire discharged electrical quantity in the entire first region, and to avoid insufficiency of charged electrical quantity, taking into account loss of the electrical quantities used in charging (for example, electrical quantities necessary to convert low oxides of lead and sulfates of lead, or basic sulfates of lead, into lead dioxide, or electrical quantities consumed in the occurrence of oxygen gas which unavoidably occurs on the positive electrode plate, and similar).

Hence in a method of controlling a lead-acid battery according to this invention, the charged electrical quantity in the first region is controlled such that the accumulated value of the charged electrical quantity throughout the first region (that is, the first entire charged electrical quantity $C_1$, which is the accumulated charged electrical quantity at the end of the first region) is an electrical quantity equal to the product of the first setting value $D_1$ and a first value $R_1$ set in advance.

Here, the first setting value $D_1$ is the accumulated discharged electrical quantity at the time the first region ends (that is, the first entire charged electrical quantity $C_1$, which is the accumulated discharged electrical quantity at the end of the first region), so that a method of controlling a lead-acid battery of this invention enables control of the charged electrical quantity in the first region such that the first entire charged electrical quantity $C_1$ becomes the electrical quantity equal to the product of the first entire charged electrical quantity $C_1$ and the first value $R_1$ set in advance.

Hence a method of controlling a lead-acid battery according to this invention can, in the first region, make the first entire charged electrical quantity $C_1$ throughout the first region an electrical quantity equal to or greater than the first entire discharged electrical quantity throughout the entire first region.

By this means, in a method of controlling a lead-acid battery according to this invention, the accumulated value of the charged electrical quantity in the entire first region is an accumulated value equal to or greater than the accumulated value of the discharged electrical quantity in the entire first region, so that insufficiency of charged electrical quantity can be avoided in the first region. Hence in the first region, the decline due to undercharging in the electrical quantity which can be charged/discharged can be reduced.

Further, the second region defined in this method is the region in which the first entire discharged electrical quantity, which is the accumulated discharged electrical quantity at the end of the first region, exceeds the first setting value $D_1$. In this second region, loss of activity of the active material of the positive electrode begins to advance. In this second region, fragmentation of lead dioxide, and more specifically, fragmentation of lead dioxide having a cluster structure, occurs, and it is thought that due to separation from the parent material, the function as active material is gradually lost. In this second region, the electrical quantity which can be charged/discharged per unit mass of lead dioxide continues to gradually decline. When, in this second region, the charged electrical quantity is excessive, the positive electrode grid (current collector) is corroded, and the electrical quantity which can be charged/discharged declines more prominently.

Hence the charged electrical quantity in the second region is desired to be controlled such that, in the second region, the proportion of the accumulated value of the charged electrical quantity in the entire second region to the accumulated value of the discharged electrical quantity in the entire second region is smaller than the proportion of the accumulated value of the charged electrical quantity in the entire first region to the accumulated value of the discharged electrical quantity in the entire first region, to reduce the prominent decline in the electrical quantity which can be charged/discharged due to charging with excessive charged electrical quantities.

Hence in a method of controlling a lead-acid battery according to this invention, the charged electrical quantity in the second region is controlled such that the second entire charged electrical quantity $C_2$, which is the second accumulated charged electrical quantity when the lead-acid battery life comes to an end, is the electrical quantity equal to the product of the second setting value $D_2$, which is the second accumulated discharged electrical quantity when the lead-acid battery life comes to an end, and a second value $R_2$ set in advance to a value smaller than the first value $R_1$.

Here, the second setting value $D_2$ is the accumulated discharged electrical quantity in the second region when the lead-acid battery life comes to an end (that is, the second entire charged electrical quantity $C_2$ which is the accumulated discharged electrical quantity at the end of the second region), so that in a method of controlling the lead-acid battery according to this invention, the charged electrical quantity in the second region can be controlled such that the second entire charged electrical quantity $C_1$ is the electrical quantity equal to the product of the second entire charged electrical quantity $C_2$ and the second value $R_2$ set in advance to a value smaller than the first value $R_1$.

Hence by means of a method of controlling a lead-acid battery according to this invention, the proportion of the accumulated value of the charged electrical quantity in the entire second region to the accumulated value of the discharged electrical quantity in the entire second region can be made smaller than the proportion of the accumulated value of the charged electrical quantity in the entire first region to the accumulated value of the discharged electrical quantity in the entire first region. Hence in the second region, the prominent decline in the electrical quantity which can be charged/discharged due to charging with excessive charged electrical quantities can be reduced.

The capacity of a lead-acid battery means the discharged electrical quantity which can be extracted from the lead-acid battery under prescribed discharge conditions. Still more generally, the capacity of a lead-acid battery means the discharged electrical quantity when the lead-acid battery is discharged from a state in which the state of charge (SOC) of the lead-acid battery is 100%, until the 0% state is reached. Such discharge conditions as the discharge rate, cut-off voltage of discharge, and battery temperature during discharge are set appropriately according to the lead-acid battery model or the application.

By means of this invention utilizing the above-described insights, when the first accumulated discharged electrical quantity representing the accumulated value of the discharged electrical quantity from the start of cycled use of a lead-acid battery is less than the first setting value $D_1$ which is the boundary between the first region and the second region, the decline in the electrical quantity which can be charged/discharged due to undercharging can be reduced, and after the first accumulated discharged electrical quantity exceeds the first setting value $D_1$, acceleration of the decline in the electrical quantity which can be charged/discharged due to overcharging can be reduced.

Hence by means of this invention, the properties of a lead-acid battery can be evaluated and reasonable charging can be repeated, so that compared with a control method in which the lead-acid battery is charged randomly, a longer life for the lead-acid battery can be achieved.

In the above method, it is desirable that the first value $R_1$ be a value in the range 1 to 1.5, that the second value $R_2$ be a value in the range 0.9 to 1.25, and moreover that the ratio $R_1/R_2$ of the first value $R_1$ and the second value $R_2$ be greater than 1 and equal to or less than 1.66.

By means of this method, the first value $R_1$ is a value in the range 1 to 1.5, so that the first entire charged electrical quantity $C_1$ can be made an electrical quantity equal to or greater than the first entire discharged electrical quantity. Further, the second value $R_2$ is a valid in the range 0.9 to 1.25, so that the proportion of the second entire charged electrical quantity $C_2$ to the second entire discharged electrical quantity can be made smaller than the proportion of the first entire charged electrical quantity $C_1$ to the first entire discharged electrical quantity.

Hence when the first accumulated discharged electrical quantity is less than the first setting value $D_1$ which is the boundary between the first region and the second region, the decline in the electrical quantity which can be charged/discharged due to undercharging can be prevented, and after the first accumulated discharged electrical quantity exceeds the first setting value $D_1$, acceleration of the decline in electrical quantity which can be charged/discharged due to overcharging can be prevented.

In the above method, it is desirable that a setting value computation step of computing the first setting value $D_1$ according to a surface temperature of the lead-acid battery be further provided.

In general, the activity of the active material of the positive electrode in a lead-acid battery is different according to the surface temperature. For example, the higher the surface temperature, the higher is the activity of the positive electrode active material, and the lower the surface temperature, the lower is the activity. And, the higher the activity of the positive electrode active material, the smaller the accumulated discharged electrical quantity (that is, the fewer the number of discharge cycles) at which the lead-acid battery capacity is maximum, and the lower the activity of the positive electrode active material, the greater the accumulated discharged electrical quantity (that is, the larger the number of discharge cycles) at which the lead-acid battery capacity is maximum.

By means of this method, the first setting value $D_1$, which is the accumulated discharged electrical quantity at which the lead-acid battery capacity is maximum, is computed according to the surface temperature of the lead-acid battery, which affects the lead-acid battery capacity; hence the first setting value $D_1$ can be computed according to the usage environment of the lead-acid battery, and a control method suited to the actual usage environment can be realized.

In the above method, it is desirable that a step of judging whether the second accumulated discharged electrical quantity computed in the second region exceeds the second setting value $D_2$, and a step of performing notification processing, be further provided when the second accumulated discharged electrical quantity exceeds the second setting value $D_2$.

By means of this method, notification is performed when the second accumulated discharged electrical quantity exceeds the second setting value $D_2$ when the lead-acid battery life comes to an end, so that the user can confirm that the lead-acid battery life has come to an end.

In the above method, it is desirable that in the control step, the charged electrical quantity for each charge cycle in the first region be controlled such that the charged electrical quantity for each charge cycle is the value equal to the product of the discharged electrical quantity in the discharge cycle immediately preceding the each charge cycle and the first value $R_1$, and the charged electrical quantity for each charge cycle in the second region be controlled such that the charged electrical quantity for each charge cycle is the value equal to the product of the discharged electrical quantity in the discharge cycle immediately preceding the each charge cycle and the second value $R_2$.

By means of this method, in the first region, charging is performed such that the charged electrical quantity for each charge cycle is the charged electrical quantity equal to the product of the discharged electrical quantity in the discharge cycle immediately preceding the charge cycle and the first value $R_1$. Further, in the second region, charging is performed such that the charged electrical quantity for each charge cycle is the charged electrical quantity equal to the product of the discharged electrical quantity in the discharge cycle immediately preceding the charge cycle and the second value $R_2$.

By this means, in both the first region and in the second region, the charged electrical quantity for each charge cycle is a charged electrical quantity which can reduce the decline in the electrical quantity by which the lead-acid battery can be charged/discharged, so that more reasonable charging can be repeated, and a still longer life for the lead-acid battery can be achieved.

It is desirable that the above method further have a first error computation step of computing, upon each execution of a charge cycle in the first region, an error obtained by subtracting, from the charged electrical quantity obtained when the charge cycle is executed, a first reference discharged electrical quantity equal to the product of the discharged electrical quantity in the discharge cycle immediately preceding the charge cycle and a coefficient $R_1$ determined in advance; a first accumulated error value computation step of computing a first accumulated error value which is an accumulated value of the errors in the first region by accumulating the errors upon each computation of the errors; a first proportion computation step of computing a first proportion, which is the proportion of the first accumulated error value to a nominal capacity of the lead-acid battery; a first proportion judgment step of judging whether the computed first proportion exceeds a first threshold value set in advance; and a correction step of, when the first proportion is judged to exceed the first threshold value, performing charging such that the charged electrical quantity in the immediately following charge cycle is the charged electrical quantity equal to the first accumulated error value at this time, and of performing correction of the first accumulated charged electrical quantity.

By means of this method, when in the first region the proportion of the first accumulated error value to the nominal capacity of the lead-acid battery exceeds the first threshold value, charging is performed such that the charged electrical quantity in the immediately following charge cycle is the charged electrical quantity equal to the first accumulated error value at this time, and correction of the first accumulated charged electrical quantity is performed. By this means, even when random charging is repeated in the first region, the first entire charged electrical quantity is the electrical quantity equal to the product of the first entire discharged electrical quantity and the coefficient $R_1$. Hence the decline in the electrical quantity which can be charged/discharged due to undercharging can be reduced, while conforming to the actual state of use of the lead-acid battery by the user.

It is desirable that the above method further have a second error computation step of computing, upon each execution of a charge cycle in the second region, an error obtained by subtracting, from the charged electrical quantity obtained when the charge cycle is executed, a second reference discharged electrical quantity equal to the product of the discharged electrical quantity in the discharge cycle immediately preceding the charge cycle and a coefficient $R_2$ determined in advance; a second accumulated error value computation step of computing a second accumulated error value which is an accumulated value of the errors in the second region by accumulating the errors upon each computation of the errors; a second proportion computation step of computing a second proportion, which is the proportion of the second accumulated error value to a nominal capacity of the lead-acid battery; a second proportion judgment step of judging whether the computed second proportion exceeds a second threshold value set in advance; and a correction step of, when the second proportion is judged to exceed the second threshold value, performing charging such that the charged electrical quantity in the immediately following charge cycle is the charged electrical quantity equal to the second accumulated error value at this time, and of performing correction of the second accumulated charged electrical quantity.

By means of this method, when in the second region the proportion of the second accumulated error value to the nominal capacity of the lead-acid battery exceeds the second threshold value, charging is performed such that the charged electrical quantity in the immediately following charge cycle is the charged electrical quantity equal to the second accumulated error value at this time, and correction of the second accumulated charged electrical quantity is performed. By this means, even when random charging is repeated in the second region, the second entire charged electrical quantity is the electrical quantity equal to the product of the second entire discharged electrical quantity and the coefficient $R_2$. Hence the decline in the electrical quantity which can be charged/discharged due to undercharging can be reduced, while conforming to the actual state of use of the lead-acid battery by the user.

In the above method, it is desirable that every time charge/discharge cycles are repeated in the first region a number of times $P_1$ set in advance, charging is performed in the immediately following charge cycle such that the first accumulated charged electrical quantity after execution of the immediately following charge cycle is an electrical quantity equal to the product of the first accumulated discharged electrical quantity at this time and a coefficient $R_{P1}$, set in advance in the range 1 to 1.5.

By means of this method, every time charge/discharge cycles in the first region are repeated the number of times $P_1$ set in advance, the charged electrical quantity is made such that the first accumulated charged electrical quantity after execution of the immediately following charge cycle can reduce the decline in the electrical quantity with which the lead-acid battery can be charged/discharged, so that the decline in the electrical quantity which can be charged/discharged due to undercharging can be reduced, while conforming to the actual state of use of the lead-acid battery by the user.

In the above method, it is desirable that every time charge/discharge cycles are repeated in the second region a number of times $P_2$ set in advance, charging is performed in the immediately following charge cycle such that the second accumulated charged electrical quantity after execution of the immediately following charge cycle is an electrical quantity equal to the product of the second accumulated discharged electrical quantity at this time and a coefficient $R_{P2}$, set in advance in the range 0.9 to 1.25.

By means of this method, every time charge/discharge cycles in the second region are repeated the number of times $P_2$ set in advance, the charged electrical quantity is made such that the second accumulated charged electrical quantity after execution of the immediately following charge cycle can reduce the prominent decline in the electrical quantity with which the lead-acid battery can be charged/discharged, so that the prominent decline in the electrical quantity which can be charged/discharged due to excessive charging can be reduced, while conforming to the actual state of use of the lead-acid battery by the user.

It is desirable that the above method further have a first error computation step of computing, upon each execution of a charge cycle in the first region, an error obtained by subtracting, from the charged electrical quantity obtained when the charge cycle is executed, a first reference discharged electrical quantity equal to the product of the discharged electrical quantity in the discharge cycle immediately preceding the charge cycle and a coefficient $R_1$ determined in advance; a first accumulated error value computation step of computing a first accumulated error value which is an accumulated value of the errors in the first region by accumulating the errors upon each computation of the errors; a counting step of counting, upon each execution of a charge/discharge cycle in the first region, the number of executions of the charge/discharge cycles; and a correction step of performing correction of the first accumulated charged electrical quantity by performing charging, every time the number $P_1$ of the charge/discharge cycles are repeated, such that the charged electrical quantity in the immediately following charge cycle is the charged electrical quantity equal to the first accumulated error value at this time.

By means of this method, every time the number $P_1$ of charge/discharge cycles are repeated in the first region, charging is performed such that the charged electrical quantity in the immediately following charge cycle is the charged electrical quantity equal to the first accumulated error value at this time, and correction of the first accumulated charged electrical quantity is performed. By this means, even when random charging is repeated in the first region, the first accumulated charged electrical quantity immediately following $P_1$ repetitions of charge/discharge cycles is the electrical quantity equal to the product of the first accumulated discharged electrical quantity at this time and the coefficient $R_{P1}$. Hence the decline in the electrical quantity which can be charged/discharged due to undercharging can be reduced, while conforming to the actual state of use of the lead-acid battery by the user.

It is desirable that the above method further have a second error computation step of computing, upon each execution of a charge cycle in the second region, an error obtained by subtracting, from the charged electrical quantity obtained when the charge cycle is executed, a second reference discharged electrical quantity equal to the product of the discharged electrical quantity in the discharge cycle immediately preceding the charge cycle and a coefficient $R_2$ determined in advance; a second accumulated error value computation step of computing a second accumulated error value which is an accumulated value of the errors in the second region by accumulating the errors upon each computation of the errors; a counting step of counting, upon each execution of a charge/discharge cycle in the second region, the number of executions of the charge/discharge cycles; and a correction step of performing correction of the second accumulated charged electrical quantity by performing charging, every time the number $P_2$ of the charge/discharge cycles are repeated, such that the charged electrical quantity in the immediately following charge cycle is the charged electrical quantity equal to the second accumulated error value at this time.

By means of this method, every time the number $P_2$ of charge/discharge cycles are repeated in the second region, charging is performed such that the charged electrical quantity in the immediately following charge cycle is the charged electrical quantity equal to the second accumulated error value at this time, and correction of the second accumulated charged electrical quantity is performed. By this means, even when random charging is repeated in the second region, the second accumulated charged electrical quantity immediately following $P_2$ repetitions of charge/discharge cycles is the electrical quantity equal to the product of the second accumulated discharged electrical quantity at this time and the coefficient $R_{P2}$. Hence the prominent decline in the electrical quantity which can be charged/discharged due to excessive charging can be reduced, while conforming to the actual state of use of the lead-acid battery by the user.

In the above method, it is desirable that the numbers $P_1$ and $P_2$ set in advance be numbers in the range 2 to 20.

By means of this method, every time numbers in the range 2 to 20 of charge/discharge cycles are executed in the first region and in the second region, the first or second accumulated charged electrical quantity immediately following is taken to be a charged electrical quantity which can reduce the decline in the electrical quantity that can be charged/discharged. Hence the decline in the electrical quantity which can be charged/discharged can be reduced, at an appropriate frequency conforming to the actual state of use of the lead-acid battery by the user.

In the above method, it is desirable that the ratio $D_1/D_{max}$ of the first setting value $D_1$ to the maximum value $D_{max}$ be in the range 20 to 200.

By means of this method, a general lead-acid battery for which $D_1/D_{max}$ is in the range 20 to 200 can be used to implement a control method according to this invention.

In the above method, it is desirable that the lead-acid battery be configured as a valve-regulated lead-acid battery.

In general, valve-regulated lead-acid batteries have sealed configurations, such that electrolyte cannot be replenished, and so the capacity of such a lead-acid battery fluctuates according to the activity of the active material of the positive electrode rather than the amount of electrolyte. Hence there is a clear demarcation between the first region and the second region, having as a boundary the first setting value $D_1$ at which the active material of the activated positive electrode begins to lose activity, and so the advantageous results of use of a control method of this invention are enhanced.

Further, a power supply system of another aspect of this invention is characterized in comprising a lead-acid battery as a power supply; a charger for charging the lead-acid battery; a first computation portion, which computes a first accumulated charged electrical quantity by accumulating a charged electrical quantity for each charge cycle from the start of cycled use of the lead-acid battery, and which computes a first accumulated discharged electrical quantity by accumulating a discharged electrical quantity for each discharge cycle from the start of cycled use of the lead-acid battery; a judgment portion, which judges that the lead-acid battery is in a first region which is a partial region in a life cycle from the start of cycled use of the lead-acid battery until the life of the lead-acid battery ends, when the first accumulated discharged electrical quantity is less than a first setting value $D_1$ which is the first accumulated discharged electrical quantity obtained when, in a process of change of a capacity of the lead-acid battery occurring due to charge/discharge cycles of the lead-acid battery, the capacity is the maximum value $D_{max}$ and judges that the lead-acid battery is in a second region which is a region after the first region and extends until the life of the lead-acid battery ends, when the first accumulated discharged electrical quantity exceeds the first setting value $D_1$; a second computation portion, which, after the lead-acid battery is judged to be in the second region by the judgment portion, computes a second accumulated charged electrical quantity by accumulating a charged electrical quantity for each charge cycle in the second region, and computes a second accumulated discharged electrical quantity by accumulating a discharged electrical quantity for each discharge cycle in the second region; and a control portion, which controls the charged electrical quantity in the first region such that a first entire charged electrical quantity $C_1$, which is the first accumulated charged electrical quantity at the end of the first region, is the electrical quantity equal to the product of the first setting value $D_1$ and a first value $R_1$ set in advance, and, after the lead-acid battery is judged to be in the second region by the judgment portion, controls the charged electrical quantity in the second region such that a second entire charged electrical quantity $C_2$, which is the second accumulated charged electrical quantity when the life of the lead-acid battery comes to an end, is the electrical quantity equal to the product of the second setting value $D_2$, which is the second accumulated discharged electrical quantity when the life of the lead-acid battery comes to an end and a second value $R_2$ set in advance to a value smaller than the first value $R_1$.

By means of this configuration, when the first accumulated discharged electrical quantity representing the accumulated value of the discharged electrical quantity from the start of cycled use of the lead-acid battery is less than the first setting value $D_1$ which is the boundary between the first region and the second region, the decline in the electrical quantity which can be charged/discharged due to undercharging can be reduced, and after the first accumulated discharged electrical quantity has exceeded the first setting value $D_1$, acceleration of the decline in the electrical quantity which can be charged/discharged due to overcharging can be reduced.

Hence by means of this invention, the properties of a lead-acid battery can be evaluated and reasonable charging can be repeated, so that compared with a control method in which the lead-acid battery is charged randomly, a longer life for the lead-acid battery can be achieved.

In the above configuration, it is desirable that the first value $R_1$ be a value in the range 1 to 1.5, that the second value $R_2$ be a value in the range 0.9 to 1.25, and moreover that the ratio $R_1/R_2$ of the first value $R_1$ and the second value $R_2$ be greater than 1 and equal to or less than 1.66.

By means of this configuration, the first value $R_1$ is a value in the range 1 to 1.5, so that the first entire charged electrical quantity $C_1$ can be made an electrical quantity equal to or greater than the first entire discharged electrical quantity. Further, the second value $R_2$ is a valid in the range 0.9 to 1.25, so that the proportion of the second entire discharged electrical quantity to the second entire charged electrical quantity $C_2$ can be made smaller than the proportion of the first entire discharged electrical quantity to the first entire charged electrical quantity $C_1$.

Hence when the first accumulated discharged electrical quantity is less than the first setting value $D_1$ which is the boundary between the first region and the second region, the decline in the electrical quantity which can be charged/discharged due to undercharging can be reduced, and after the first accumulated discharged electrical quantity has exceeded the first setting value $D_1$, acceleration of the decline in the electrical quantity which can be charged/discharged due to overcharging can be reduced.

In the above configuration, it is desirable that the control portion compute the first setting value $D_1$ according to a surface temperature of the lead-acid battery.

By means of this configuration, the first setting value $D_1$ which is the accumulated discharged electrical quantity at which the lead-acid battery capacity is maximum is computed according to the surface temperature of the lead-acid battery, which affects the lead-acid battery capacity; hence the first setting value $D_1$ can be computed according to the usage environment of the lead-acid battery, and a control method suited to the actual usage environment can be realized.

In the above configuration, it is desirable that a notification portion for performing notification processing be further provided, that the judgment portion judges whether the second accumulated discharged electrical quantity computed in the second region exceeds the second setting value $D_2$, and that the notification portion performs notification processing when the judgment portion has judged that the second accumulated discharged electrical quantity exceeds the second setting value $D_2$.

By means of this configuration, notification is performed when the second accumulated discharged electrical quantity exceeds the second setting value $D_2$ at the time the lead-acid battery life comes to an end, so that the user can confirm that the lead-acid battery life has come to an end.

In the above configuration, it is desirable that the control portion control the charged electrical quantity for each charge cycle in the first region such that the charged electrical quantity for each charge cycle is the value equal to the product of the discharged electrical quantity in the discharge cycle immediately preceding the each charge cycle and the first value $R_1$, and control the charged electrical quantity for each charge cycle in the second region such that the charged electrical quantity for each charge cycle is the value equal to the product of the discharged electrical quantity in the discharge cycle immediately preceding the each charge cycle and the second value $R_2$.

By means of this configuration, in the first region, charging is performed such that the charged electrical quantity for each charge cycle is the charged electrical quantity equal to the product of the discharged electrical quantity in the discharge cycle immediately preceding the charged electrical quantity and the first value $R_1$. Further, in the second region, charging is performed such that the charged electrical quantity for each charge cycle is the charged electrical quantity equal to the product of the discharged electrical quantity in the discharge cycle immediately preceding the charged electrical quantity and the second value $R_2$.

By this means, in both the first region and in the second region, the charged electrical quantity for each charge cycle is made a charged electrical quantity which can reduce the decline in the electrical quantity with which the lead-acid battery can be charged/discharged, so that more reasonable charging can be repeated, and a still longer life for the lead-acid battery can be achieved.

In the above configuration, it is desirable that a first error computation portion, which computes, upon each execution of a charge cycle in the first region, an error obtained by subtracting, from the charged electrical quantity obtained when the charge cycle is executed, a first reference discharged electrical quantity equal to the product of the discharged electrical quantity in the discharge cycle immediately preceding the charge cycle and a coefficient $R_1$ determined in advance, a first accumulated error value computation portion, which computes a first accumulated error value which is an accumulated value of the errors in the first region by accumulating the errors upon each computation of errors, and a first proportion computation portion, which computes a first proportion which is the proportion of the first accumulated error value to a nominal capacity of the lead-acid battery, be further provided; and that the judgment portion judge whether the computed first proportion exceeds a first threshold value set in advance, and when the first proportion is judged to exceed the first threshold value, that the control portion perform correction of the first accumulated charged electrical quantity by performing charging such that the charged electrical quantity in the immediately following charge cycle is the charged electrical quantity equal to the first accumulated error value at this time.

By means of this configuration, when in the first region the proportion of the first accumulated error value to the lead-acid battery nominal capacity exceeds the first threshold value, charging is performed such that the charged electrical quantity in the immediately following charge cycle is the charged electrical quantity equal to the first accumulated error value at this time, and correction of the first accumulated charged electrical quantity is performed. By this means, even when random charging is repeated in the first region, the first entire charged electrical quantity becomes the electrical quantity equal to the product of the first entire discharged electrical quantity and the coefficient $R_1$. Hence the decline in the electrical quantity which can be charged/discharged due to undercharging can be reduced, while conforming to the actual state of use of the lead-acid battery by the user.

In the above configuration, it is desirable that a second error computation portion, which computes, upon each execution of a charge cycle in the second region, an error obtained by subtracting, from the charged electrical quantity obtained when the charge cycle is executed, a second reference discharged electrical quantity equal to the product of the discharged electrical quantity in the discharge cycle immediately preceding the charge cycle and a coefficient $R_2$ determined in advance, a second accumulated error value computation portion, which computes a second accumulated error value which is an accumulated value of the errors in the second region by accumulating the errors upon each computation of errors, and a second proportion computation portion, which computes a second proportion which is the proportion of the second accumulated error value to a nominal capacity of the lead-acid battery, be further provided; and that the judgment portion judge whether the computed second proportion exceeds a second threshold value set in advance, and when the second proportion is judged to exceed the second threshold value, that the control portion perform correction of the second accumulated charged electrical quantity by performing charging such that the charged electrical quantity in the immediately following charge cycle is the charged electrical quantity equal to the second accumulated error value at this time.

By means of this configuration, when in the second region the proportion of the second accumulated error value to the lead-acid battery nominal capacity exceeds the second threshold value, charging is performed such that the charged electrical quantity in the immediately following charge cycle is the charged electrical quantity equal to the second accumulated error value at this time, and correction of the second accumulated charged electrical quantity is performed. By this means, even when random charging is repeated in the second region, the second entire charged electrical quantity becomes the electrical quantity equal to the product of the second entire discharged electrical quantity and the coefficient $R_2$. Hence the prominent decline in the electrical quantity which can be charged/discharged due to excessive charging can be reduced, while conforming to the actual state of use of the lead-acid battery by the user.

In the above configuration, it is desirable that every time charge/discharge cycles are repeated in the first region a number of times $P_1$ set in advance, the control portion perform charging in the immediately following charge cycle such that the first accumulated charged electrical quantity after execution of the immediately following charge cycle is an electrical quantity equal to the product of the first accumulated discharged electrical quantity at this time and a coefficient $R_{P1}$ set in advance, and that every time charge/discharge cycles are repeated in the second region a number of times $P_2$ set in advance, the control portion perform charging in the immediately following charge cycle such that the second accumulated charged electrical quantity after execution of the immediately following charge cycle is an electrical quantity equal to the product of the second accumulated discharged electrical quantity at this time and a coefficient $R_{P2}$ set in advance to a value smaller than the coefficient $R_{P1}$.

By means of this configuration, every time the number $P_1$ set in advance of charge/discharge cycles is repeated in the first region, the first accumulated charged electrical quantity after execution of the immediately following charge cycle is a charged electrical quantity which can reduce the decline in the electrical quantity with which the lead-acid battery can be charged/discharged, so that the decline in the electrical quantity which can be charged/discharged due to undercharging can be reduced, while conforming more closely to the actual state of use by the user.

In the above configuration, it is desirable that a first error computation portion, which computes, upon each execution of a charge cycle in the first region, an error obtained by subtracting, from the charged electrical quantity obtained when the charge cycle is executed, a first reference discharged electrical quantity equal to the product of the discharged electrical quantity in the discharge cycle immediately preceding the charge cycle and a coefficient $R_1$ determined in advance, and a first accumulated error value computation portion, which computes a first accumulated error value which is an accumulated value of the errors in the first region by accumulating the errors upon each computation of errors, and, be further provided; and that the control portion count, upon each execution of a charge/discharge cycle in the first region, the number of executions of the charge/discharge cycles, and perform correction of the first accumulated charged electrical quantity by performing charging, every time the number $P_1$ of charge/discharge cycles are repeated, such that the charged electrical quantity in the immediately following charge cycle is the charged electrical quantity equal to the first accumulated error value at this time.

By means of this configuration, every time the number $P_1$ of charge/discharge cycles is repeated in the first region, charging is performed such that the charged electrical quantity in the immediately following charge cycle is the charged electrical quantity equal to the first accumulated error value, and correction of the first accumulated charged electrical quantity is performed. By this means, even when random charging is repeated in the first region, the first accumulated charged electrical quantity immediately after the number $P_1$ of charge/discharge cycles have been repeated is the electrical quantity equal to the product of the first accumulated discharged electrical quantity and the coefficient $R_{P1}$. Hence the decline in the electrical quantity which can be charged/discharged due to undercharging can be reduced, while conforming to the actual state of use of the lead-acid battery by the user.

In the above configuration, it is desirable that a second error computation portion, which computes, upon each execution of a charge cycle in the second region, an error obtained by subtracting, from the charged electrical quantity obtained when the charge cycle is executed, a second reference discharged electrical quantity equal to the product of the discharged electrical quantity in the discharge cycle immediately preceding the charge cycle and a coefficient $R_2$ determined in advance, and a second accumulated error value computation portion, which computes a second accumulated error value which is an accumulated value of the errors in the second region by accumulating the errors upon each computation of errors, be further provided; and that the control portion count, upon each execution of a charge/discharge cycle in the second region, the number of executions of the charge/discharge cycles, and perform correction of the second accumulated charged electrical quantity by performing charging, every time the number $P_2$ of the charge/discharge cycles are repeated, such that the charged electrical quantity in the immediately following charge cycle is the charged electrical quantity equal to the second accumulated error value at this time.

By means of this configuration, every time the number $P_2$ of charge/discharge cycles is repeated, charging is performed such that the charged electrical quantity in the immediately following charge cycle is the charged electrical quantity equal to the second accumulated error value, and correction of the second accumulated charged electrical quantity is performed. By this means, even when random charging is repeated in the second region, the second accumulated charged electrical quantity immediately after the number $P_2$ of charge/discharge cycles have been repeated is the electrical quantity equal to the product of the second accumulated discharged electrical quantity and the coefficient $R_{P2}$. Hence the prominent decline in the electrical quantity which can be charged/discharged due to excessive charging can be reduced, while conforming to the actual state of use of the lead-acid battery by the user.

In the above configuration, it is desirable that the numbers $P_1$ and $P_2$ set in advance be numbers in the range 2 to 20.

By means of this configuration, every time numbers in the range 2 to 20 of charge/discharge cycles are executed in the first region and in the second region, the first or second accumulated charged electrical quantity immediately following is taken to be a charged electrical quantity which can reduce the decline in the electrical quantity that can be charged/discharged. Hence the decline in the electrical quantity which can be charged/discharged can be reduced, at an appropriate frequency conforming to the actual state of use of the lead-acid battery by the user.

In the above configuration, it is desirable that the coefficient $R_{P1}$ be a value in the range 1 to 1.5, that the coefficient $R_{P2}$ be a value in the range 0.9 to 1.25, and moreover that the ratio $R_{P1}/R_{P2}$ of the coefficients $R_{P1}$ and $R_{P2}$ be greater than 1 and equal to or less than 1.66.

By means of this configuration, the coefficient $R_1$ is made a value in the range 1 to 1.5, so that every time a number $P_1$ of charge/discharge cycles are repeated in the first region, the immediately following first accumulated charged electrical quantity can be made an electrical quantity equal to or greater than the first accumulated discharged electrical quantity at this time. Further, the coefficient $R_2$ is made a value in the range 0.9 to 1.25, so that the proportion of the immediately following second accumulated charged electrical quantity to the second accumulated discharged electrical quantity at this time can be made smaller than the proportion of the first accumulated charged electrical quantity immediately after the number $P_1$ of charge/discharge cycles in the first region to the first accumulated discharged electrical quantity at this time.

Hence the decline in the electrical quantity which can be charged/discharged can be reduced, at an appropriate frequency conforming to the actual state of use by the user.

In the above configuration, it is desirable that the ratio $D_1/D_{max}$ of the first setting value $D_1$ to the maximum value $D_{max}$ be a ratio in the range 20 to 200.

By means of this configuration, a general lead-acid battery for which $D_1/D_{max}$ is in the range 20 to 200 can be used to perform control of the lead-acid battery.

In the above configuration, it is desirable that the lead-acid battery be configured as a valve-regulated lead-acid battery.

In general, valve-regulated lead-acid batteries have sealed configurations, such that electrolyte cannot be replenished, and so the capacity of such a lead-acid battery fluctuates according to the activity of the active material of the positive electrode rather than the amount of electrolyte. Hence by means of this configuration, there is a clear demarcation between the first region and the second region having as the boundary the first setting value $D_1$, at which the active material of the activated positive electrode begins to lose activity.

INDUSTRIAL APPLICABILITY

A method of control of a lead-acid battery and a power supply system of this invention promote the use of lead-acid batteries, which are safe and can withstand harsh use, in the power supplies of electric-powered vehicles in which charging is principally irregular, and so can have a large impact on industrial development.

The invention claimed is:

1. A method of controlling a lead-acid battery, comprising:
a first computation step of computing a first accumulated charged electrical quantity by accumulating a charged electrical quantity for each charge cycle from the start of cycled use of a lead-acid battery, and of computing a first accumulated discharged electrical quantity by accumulating a discharge electrical quantity for each discharge cycle from the start of cycled use of the lead-acid battery;
a judgment step of judging that the lead-acid battery is in a first region which is a partial region in a life cycle from the start of cycled use of the lead-acid battery until the life of the lead-acid battery ends, when the first accumulated discharged electrical quantity is less than a first setting value $D_1$ which is the first accumulated discharged electrical quantity obtained when, in a process of change of a capacity of the lead-acid battery occurring due to charge/discharge cycles of the lead-acid battery, the capacity is the maximum value $D_{max}$, and of judging that the lead-acid battery is in a second region which is a region after the first region and extends until the life of the lead-acid battery ends, when the first accumulated discharged electrical quantity exceeds the first setting value $D_1$;
a second computation step of, after judging in the judgment step that the lead-acid battery is in the second region, computing a second accumulated charged electrical quantity by accumulating a charged electrical quantity for each charge cycle in the second region, and of computing a second accumulated discharged electrical quantity by accumulating a discharged electrical quantity for each discharge cycle in the second region; and
a control step of controlling the charged electrical quantity in the first region such that a first entire charged electrical quantity $C_1$, which is the first accumulated charged electrical quantity at the end of the first region, is the electrical quantity equal to the product of the first setting value $D_1$ and a first value $R_1$ set in advance, and of controlling, after the lead-acid battery is judged to be in the second region, the charged electrical quantity in the second region such that a second entire charged electrical quantity $C_2$, which is the second accumulated charged electrical quantity when the life of the lead-acid battery comes to an end, is the electrical quantity equal to the product of the second setting value $D_2$, which is the second accumulated discharged electrical quantity when the life of the lead-acid battery comes to an end, and a second value $R_2$ set in advance to a value smaller than the first value $R_1$.

2. The method of controlling a lead-acid battery according to claim 1, wherein the first value $R_1$ is a value in the range 1 to 1.5, the second value $R_2$ is a value in the range 0.9 to 1.25, and moreover the ratio $R_1/R_2$ of the first value $R_1$ and the second value $R_2$ is greater than 1 and equal to or less than 1.66.

3. The method of controlling a lead-acid battery according to claim 1, further comprising a setting value computation step of computing the first setting value $D_1$ according to a surface temperature of the lead-acid battery.

4. The method of controlling a lead-acid battery according to claim 1, further comprising a step of judging whether the second accumulated discharged electrical quantity computed in the second region exceeds the second setting value $D_2$, and a step of performing notification processing when the second accumulated discharged electrical quantity exceeds the second setting value $D_2$.

5. The method of controlling a lead-acid battery according to claim 1, wherein, in the control step, the charged electrical quantity for each charge cycle in the first region is controlled such that the charged electrical quantity for each charge cycle is the value equal to the product of the discharged electrical quantity in the discharge cycle immediately preceding the each charge cycle and the first value $R_1$, and the charged electrical quantity for each charge cycle in the second region is controlled such that the charged electrical quantity for each charge cycle is the value equal to the product of the discharged electrical quantity in the discharge cycle immediately preceding the each charge cycle and the second value $R_2$.

6. The method of controlling a lead-acid battery according to claim 1, further comprising:
a first error computation step of computing, upon each execution of a charge cycle in the first region, an error obtained by subtracting, from the charged electrical quantity obtained when the charge cycle is executed, a first reference discharged electrical quantity equal to the product of the discharged electrical quantity in the discharge cycle immediately preceding the charge cycle and a coefficient $R_1$ determined in advance;
a first accumulated error value computation step of computing a first accumulated error value which is an accumulated value of the errors in the first region by accumulating the errors upon each computation of the errors;
a first proportion computation step of computing a first proportion which is a proportion of the first accumulated error value to a nominal capacity of the lead-acid battery;
a first proportion judgment step of judging whether the computed first proportion exceeds a first threshold value set in advance; and
a correction step of, when the first proportion is judged to exceed the first threshold value, performing correction of the first accumulated charged electrical quantity by performing charging in the immediately following charge cycle of a charged electrical quantity obtained by adding, to the first accumulated error value at this time, an electrical quantity equal to the product of the discharged electrical quantity in the immediately preceding discharge cycle and the first value $R_1$.

7. The method of controlling a lead-acid battery according to claim 1, further comprising:
a second error computation step of computing, upon each execution of a charge cycle in the second region, an error obtained by subtracting, from the charged electrical quantity obtained when the charge cycle is executed, a second reference discharged electrical quantity equal to the product of the discharged electrical quantity in the discharge cycle immediately preceding the charge cycle and a coefficient $R_2$ determined in advance;
a second accumulated error value computation step of computing a second accumulated error value which is an accumulated value of the errors in the second region by accumulating the errors upon each computation of the errors;
a second proportion computation step of computing a second proportion, which is the proportion of the second accumulated error value to a nominal capacity of the lead-acid battery;
a second proportion judgment step of judging whether the computed second proportion exceeds a second threshold value set in advance; and
a correction step of, when the second proportion is judged to exceed the second threshold value, performing correction of the second accumulated charged electrical quantity by performing charging in the immediately following charge cycle of a charged electrical quantity obtained by adding, to the second accumulated error value at this time, an electrical quantity equal to the product of the discharged electrical quantity in the immediately preceding discharge cycle and the second value $R_7$.

8. The method of controlling a lead-acid battery according to claim 1, wherein every time charge/discharge cycles are repeated in the first region a number of times $P_1$ set in advance, charging is performed in the immediately following charge cycle such that the first accumulated charged electrical quantity after execution of the immediately following charge cycle is an electrical quantity equal to the product of the first accumulated discharged electrical quantity at this time and a coefficient $R_{P1}$, set in advance in the range 1 to 1.5.

9. The method of controlling a lead-acid battery according to claim 8, further comprising:
a first error computation step of computing, upon each execution of a charge cycle in the first region, an error obtained by subtracting, from the charged electrical quantity obtained when the charge cycle is executed, a first reference discharged electrical quantity equal to the product of the discharged electrical quantity in the discharge cycle immediately preceding the charge cycle and a coefficient $R_1$ determined in advance;
a first accumulated error value computation step of computing a first accumulated error value which is an accumulated value of the errors in the first region by accumulating the errors upon each computation of the errors;
a counting step of counting, upon each execution of a charge/discharge cycle in the first region, the number of executions of the charge/discharge cycles; and
a correction step of performing correction of the first accumulated charged electrical quantity by performing charging, every time the number $P_1$ of the charge/discharge cycles are repeated, such that the charged electrical quantity in the immediately following charge cycle is the charged electrical quantity equal to the first accumulated error value at this time.

10. The method of controlling a lead-acid battery according to claim 8, wherein the number $P_1$ set in advance is a number in the range 2 to 20.

11. The method of controlling a lead-acid battery according to claim 1, wherein every time charge/discharge cycles are repeated in the second region a number of times $P_2$ set in advance, charging is performed in the immediately following charge cycle such that the second accumulated charged electrical quantity after execution of the immediately following charge cycle is an electrical quantity equal to the product of the second accumulated discharged electrical quantity at this time and a coefficient $R_{P2}$, set in advance in the range 0.9 to 1.25.

12. The method of controlling a lead-acid battery according to claim 11, further comprising:
a second error computation step of computing, upon each execution of a charge cycle in the second region, an error obtained by subtracting, from the charged electrical quantity obtained when the charge cycle is executed, a second reference discharged electrical quantity equal to the product of the discharged electrical quantity in the discharge cycle immediately preceding the charge cycle and a coefficient $R_2$ determined in advance;
a second accumulated error value computation step of computing a second accumulated error value which is an accumulated value of the errors in the second region by accumulating the errors upon each computation of the errors;
a counting step of counting, upon each execution of a charge/discharge cycle in the second region, the number of executions of the charge/discharge cycles; and
a correction step of performing correction of the second accumulated charged electrical quantity by performing charging, every time the number $P_2$ of the charge/discharge cycles are repeated, such that the charged electrical quantity in the immediately following charge cycle is the charged electrical quantity equal to the second accumulated error value at this time.

13. The method of controlling a lead-acid battery according to claim 11, wherein the number $P_2$ set in advance is a number in the range 2 to 20.

14. The method of controlling a lead-acid battery according to claim 1, wherein the ratio $D_1/D_{max}$, of the first setting value $D_1$ to the maximum value $D_{max}$ is in the range 20 to 200.

15. The method of controlling a lead-acid battery according to claim 1, wherein the lead-acid battery is configured as a valve-regulated lead-acid battery.

16. A power supply system, comprising:
a lead-acid battery as a power supply;
a charger for charging the lead-acid battery;
a first computation portion, which computes a first accumulated charged electrical quantity by accumulating a charged electrical quantity for each charge cycle from the start of cycled use of the lead-acid battery, and which computes a first accumulated discharged electrical quantity by accumulating a discharged electrical quantity for each discharge cycle from the start of cycled use of the lead-acid battery;
a judgment portion, which judges that the lead-acid battery is in a first region which is a partial region in a life cycle from the start of cycled use of the lead-acid battery until the life of the lead-acid battery ends, when the first accumulated discharged electrical quantity is less than a first setting value $D_1$ which is the first accumulated discharged electrical quantity obtained when, in a process of change of a capacity of the lead-acid battery occurring due to charge/discharge cycles of the lead-acid battery, the capacity is the maximum value $D_{max}$, and judges that the lead-acid battery is in a second region which is a region after the first region and extends until the life of the lead-acid battery ends, when the first accumulated discharged electrical quantity exceeds the first setting value $D_1$;

a second computation portion, which, after the lead-acid battery is judged to be in the second region by the judgment portion, computes a second accumulated charged electrical quantity by accumulating a charged electrical quantity for each charge cycle in the second region, and computes a second accumulated discharged electrical quantity by accumulating a discharged electrical quantity for each discharge cycle in the second region; and a control portion, which controls the charged electrical quantity in the first region such that a first entire charged electrical quantity $C_1$, which is the first accumulated charged electrical quantity at the end of the first region, is the electrical quantity equal to the product of the first setting value $D_1$ and a first value $R_1$ set in advance, and, after the lead-acid battery is judged to be in the second region by the judgment portion, controls the charged electrical quantity in the second region such that a second entire charged electrical quantity $C_2$, which is the second accumulated charged electrical quantity when the life of the lead-acid battery comes to an end, is the electrical quantity equal to the product of the second setting value $D_2$, which is the second accumulated discharged electrical quantity when the life of the lead-acid battery comes to an end and a second value $R_2$ set in advance to a value smaller than the first value $R_1$.

17. The power supply system according to claim 16, wherein the first value $R_1$ is a value in the range 1 to 1.5, the second value $R_2$ is a value in the range 0.9 to 1.25, and moreover the ratio $R_1/R_2$ of the first value $R_1$ and the second value $R_2$ is greater than 1 and equal to or less than 1.66.

18. The power supply system according to claim 16, wherein the control portion computes the first setting value $D_1$ according to a surface temperature of the lead-acid battery.

19. The power supply system according to claim 16, further comprising a notification portion for performing notification processing, wherein the judgment portion judges whether the second accumulated discharged electrical quantity computed in the second region exceeds the second setting value $D_2$, and the notification portion performs notification processing when the judgment portion has judged that the second accumulated discharged electrical quantity exceeds the second setting value $D_2$.

20. The power supply system according to claim 16, wherein the control portion controls the charged electrical quantity for each charge cycle in the first region such that the charged electrical quantity for each charge cycle is the value equal to the product of the discharged electrical quantity in the discharge cycle immediately preceding the each charge cycle and the first value $R_1$, and controls the charged electrical quantity for each charge cycle in the second region such that the charged electrical quantity for each charge cycle is the value equal to the product of the discharged electrical quantity in the discharge cycle immediately preceding the each charge cycle and the second value $R_2$.

* * * * *